(12) United States Patent
Selirio et al.

(10) Patent No.: US 11,746,960 B2
(45) Date of Patent: Sep. 5, 2023

(54) PIPE ASSEMBLY WITH STATIC MIXER AND FLOW CONDITIONER

(71) Applicant: Canada Pipeline Accessories Co., Ltd., Calgary (CA)

(72) Inventors: Reginald Selirio, Calgary (CA); Raphael Selirio, Calgary (CA); Daniel Sawchuk, Chestermere (CA)

(73) Assignee: Canada Pipeline Accessories Co., Ltd., Calgary (CA)

( * ) Notice: Subject to any disclaimer, the term of this patent is extended or adjusted under 35 U.S.C. 154(b) by 282 days.

(21) Appl. No.: 16/760,526

(22) PCT Filed: May 2, 2019

(86) PCT No.: PCT/CA2019/050576
§ 371 (c)(1),
(2) Date: Apr. 30, 2020

(87) PCT Pub. No.: WO2019/213750
PCT Pub. Date: Nov. 14, 2019

(65) Prior Publication Data
US 2021/0080062 A1    Mar. 18, 2021

Related U.S. Application Data

(60) Provisional application No. 62/667,693, filed on May 7, 2018.

(51) Int. Cl.
*F17D 1/20* (2006.01)
*B01F 25/431* (2022.01)
*B01F 33/81* (2022.01)

(52) U.S. Cl.
CPC .............. *F17D 1/20* (2013.01); *B01F 25/431* (2022.01); *B01F 33/811* (2022.01); *B01F 25/43171* (2022.01)

(58) Field of Classification Search
None
See application file for complete search history.

(56) References Cited

U.S. PATENT DOCUMENTS

| | | |
|---|---|---|
| 1,113,041 A | 10/1914 | Murphy |
| 1,637,697 A | 8/1927 | Jacobsen |

(Continued)

FOREIGN PATENT DOCUMENTS

| | | | |
|---|---|---|---|
| DE | 10361411 A1 | 7/2005 | |
| EP | 2388063 A1 * | 11/2011 | .......... B01F 3/04049 |

(Continued)

OTHER PUBLICATIONS

Written Opinion of the International Searching Authority, PCT/CA2017/051153, dated Jan. 5, 2018.

(Continued)

*Primary Examiner* — Matthew G Marini
(74) *Attorney, Agent, or Firm* — CAHN & SAMUELS, LLP

(57) ABSTRACT

A device to be installed in a pipeline, characterized by at least one static mixer and at least one pre-mixer arranged in a sleeve, wherein said at least one static mixer is characterized by: a body having a plurality of slots through the body, said slots having one or more sides that are angled with respect to an axis passing through a center of the body; a plurality of arms extending from an outer edge of the body towards a center of the body, wherein the plurality of slots comprising at least one concentric ring of slots.

13 Claims, 17 Drawing Sheets

(56) References Cited

U.S. PATENT DOCUMENTS

| | | | |
|---|---|---|---|
| 1,648,708 A | 11/1927 | Wilkinson | |
| 1,702,274 A | 2/1929 | Schmidt | |
| 2,693,391 A | 11/1954 | Manseau | |
| 3,128,794 A | 4/1964 | Boucher et al. | |
| 3,682,443 A | 8/1972 | Upmeier | |
| 3,863,678 A | 2/1975 | Petterson et al. | |
| 3,911,073 A | 10/1975 | Charles-Massance | |
| 4,208,136 A | 6/1980 | King | |
| 4,461,579 A | 7/1984 | McCallum | |
| 4,495,858 A | 1/1985 | Erickson | |
| 4,614,440 A | 9/1986 | King | |
| 4,848,920 A * | 7/1989 | Heathe | B01F 25/432 366/339 |
| 4,971,450 A | 11/1990 | Gerich | |
| 5,529,093 A | 6/1996 | Gallagher et al. | |
| 5,605,399 A | 2/1997 | King | |
| 6,379,035 B1 | 4/2002 | Kubo et al. | |
| 6,615,872 B2 | 9/2003 | Goebel et al. | |
| 6,878,056 B2 | 4/2005 | Robinson | |
| 7,198,400 B2 | 4/2007 | Unterlander et al. | |
| 7,543,561 B2 | 6/2009 | Shibata et al. | |
| 7,784,273 B2 | 8/2010 | Kanaya et al. | |
| 7,954,514 B2 | 6/2011 | Tung et al. | |
| 8,042,989 B2 | 11/2011 | Gordon et al. | |
| 8,141,353 B2 | 3/2012 | Zheng et al. | |
| 8,220,444 B2 | 7/2012 | Cheung et al. | |
| 8,342,159 B2 * | 1/2013 | Detore | F02M 27/04 123/538 |
| 8,375,708 B2 | 2/2013 | Forster et al. | |
| 8,495,866 B2 | 7/2013 | Wirth | |
| D697,942 S | 1/2014 | Puczok et al. | |
| 8,739,519 B2 | 6/2014 | Hadden et al. | |
| 8,745,978 B2 | 6/2014 | Vanvolsem et al. | |
| 8,826,649 B2 * | 9/2014 | Li | F01N 3/2892 366/330.4 |
| 9,010,994 B2 | 4/2015 | McQueen et al. | |
| 9,016,928 B1 | 4/2015 | England et al. | |
| 9,067,183 B2 | 6/2015 | Glanville | |
| 9,221,022 B2 | 12/2015 | Glanville | |
| 9,718,037 B2 | 8/2017 | Harmon et al. | |
| 9,790,833 B2 | 10/2017 | Kobe et al. | |
| 9,835,068 B2 | 12/2017 | Mueller et al. | |
| 9,975,094 B2 | 5/2018 | Gillis et al. | |
| 10,288,292 B2 | 5/2019 | Ryon | |
| 10,500,550 B2 | 12/2019 | Geibel | |
| 10,947,882 B2 | 3/2021 | Park | |
| 2001/0038575 A1 | 11/2001 | Mathys et al. | |
| 2002/0191483 A1 | 12/2002 | Ohtsuki et al. | |
| 2003/0007419 A1 | 1/2003 | Goebel et al. | |
| 2005/0039809 A1 | 2/2005 | Speldrich et al. | |
| 2005/0099886 A1 | 5/2005 | Grajewski et al. | |
| 2005/0219947 A1 | 10/2005 | Carlson | |
| 2006/0162690 A1 | 7/2006 | Kim | |
| 2007/0205523 A1 * | 9/2007 | Kojima | B01F 25/4312 261/79.2 |
| 2008/0037366 A1 | 2/2008 | Smith | |
| 2008/0079179 A1 | 4/2008 | Lundgreen et al. | |
| 2008/0232190 A1 | 9/2008 | Schneider | |
| 2009/0266064 A1 * | 10/2009 | Zheng | B01F 25/25 60/317 |
| 2009/0320453 A1 | 12/2009 | Salanta et al. | |
| 2010/0084034 A1 | 4/2010 | Sonnenberg | |
| 2010/0104705 A1 | 4/2010 | Gordon et al. | |
| 2010/0107617 A1 | 5/2010 | Kaiser et al. | |
| 2011/0174407 A1 * | 7/2011 | Lundberg | B01F 25/4315 138/37 |
| 2011/0174408 A1 | 7/2011 | Lundberg et al. | |
| 2012/0096948 A1 | 4/2012 | Laird et al. | |
| 2012/0204541 A1 | 8/2012 | Li et al. | |
| 2012/0297870 A1 | 11/2012 | de Boer | |
| 2013/0176814 A1 | 7/2013 | Gillis et al. | |
| 2013/0286769 A1 | 10/2013 | Baron | |
| 2014/0301157 A1 | 10/2014 | Glanville | |
| 2015/0211398 A1 | 7/2015 | Hornback et al. | |
| 2016/0097411 A1 * | 4/2016 | Sawchuk | F16L 55/02709 29/890.14 |
| 2016/0175784 A1 | 6/2016 | Harmon et al. | |
| 2016/0177801 A1 | 6/2016 | Wohlfahrt | |
| 2017/0291151 A1 | 10/2017 | Berglund | |
| 2017/0362987 A1 | 12/2017 | Fu et al. | |
| 2018/0085719 A1 | 3/2018 | Larner et al. | |
| 2018/0280900 A1 | 10/2018 | Tucker | |
| 2018/0296993 A1 | 10/2018 | Schriver et al. | |
| 2018/0306084 A1 | 10/2018 | Inoue et al. | |
| 2019/0162490 A1 | 5/2019 | Heusser | |
| 2020/0030825 A1 | 1/2020 | Otoguro | |
| 2020/0149687 A1 | 5/2020 | Selirio et al. | |

FOREIGN PATENT DOCUMENTS

| | | | |
|---|---|---|---|
| EP | 2596854 A1 | 5/2013 | |
| EP | 2826547 A1 * | 1/2015 | B01F 5/0604 |
| EP | 2826547 A1 | 1/2015 | |
| FR | 2921415 A1 | 3/2009 | |
| JP | 2009041371 A | 2/2009 | |
| WO | 2016024207 A1 | 2/2016 | |
| WO | WO-2018021330 A1 * | 2/2018 | B01F 3/04 |

OTHER PUBLICATIONS

English Abstract of DE 10361411, Jul. 28, 2005.
Westfall, Low Headloss Pipeline Mixer Model 3050, 4 pages, printed on Jul. 6, 2018.
Koflo, Static Inline Mixers, 3 pages, printed on Jul. 6, 2018.
Komax, Static Mixers—Komax Systems Inc, 1 page, printed on Jul. 6, 2018.
Statiflo, Pipe Mixers, 2 pages, printed on printed on Jul. 6, 2018.
English abstract of FR 2921415 A1, Mar. 27, 2009.
English abstract of JP 2009041371 A, Feb. 26, 2009.
English translation of JP 2009041371 A, Feb. 26, 2009.
English machine translation of FR 2921415 A1, Mar. 27, 2009.
"How a Flow Conditioner Works—Flow Conditioning Basics", www.instrumentaltoolbox.com/2016/01, pp. 1-2, printed on Oct. 22, 2019.

\* cited by examiner

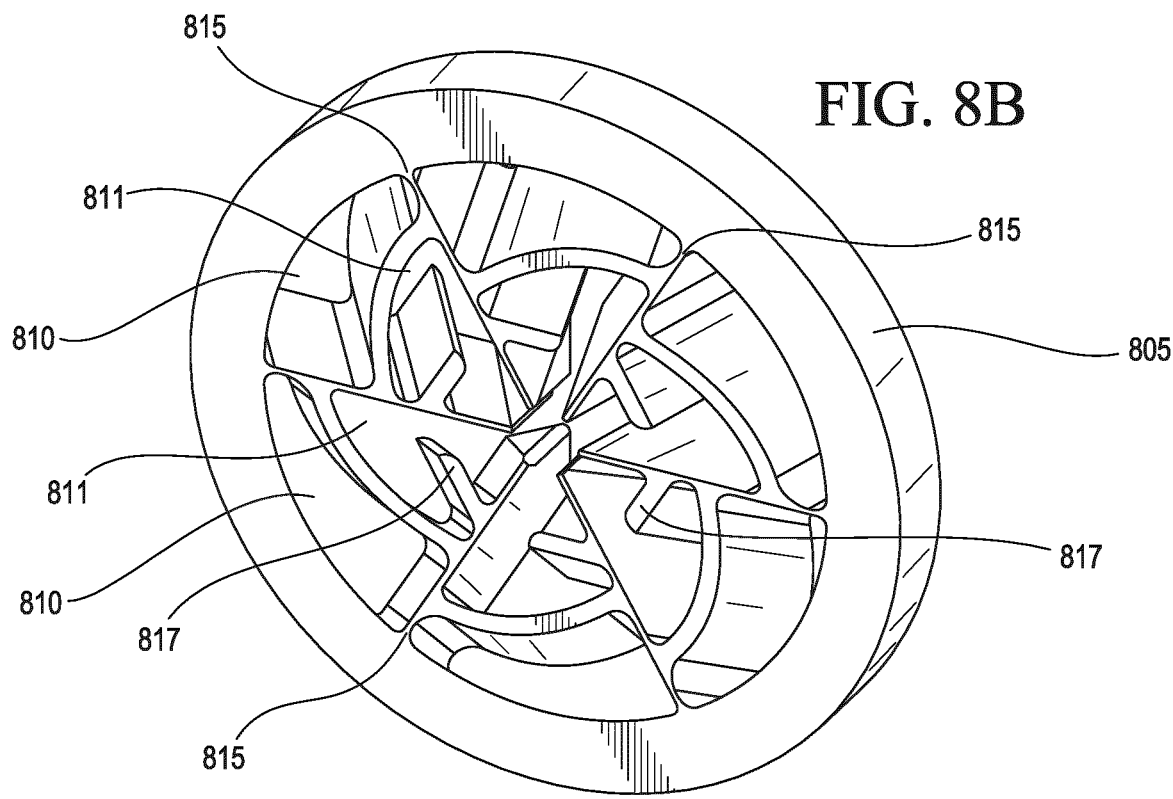
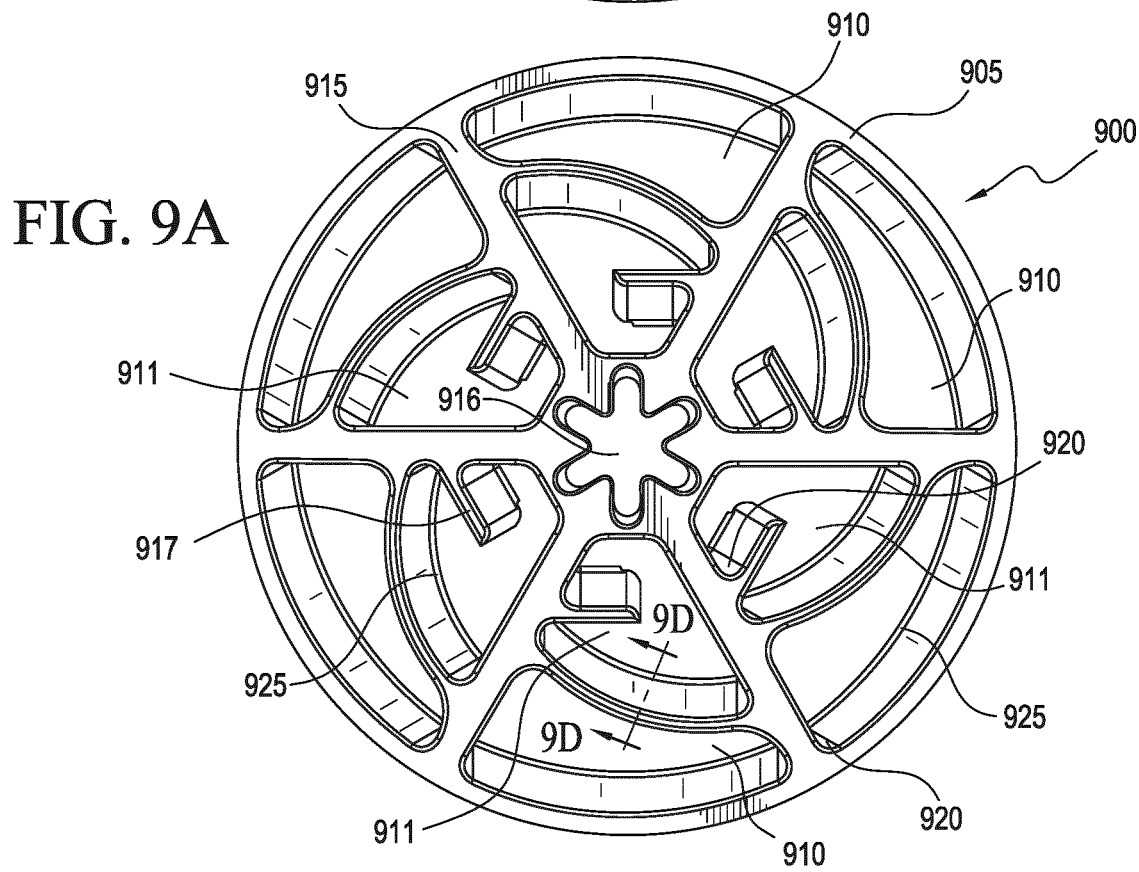

PIPE ASSEMBLY WITH STATIC MIXER AND FLOW CONDITIONER

This is a U.S. national stage application of PCT international application PCT/CA2019/050576 filed on 2 May 2019 and claims priority to U.S. Ser. No. 62/667,693 filed on 7 May 2018 in the U.S. Patent and Trademark Office.

I. FIELD OF INVENTION

The present invention relates to a mixing device used in pipelines, for example, in at least one of chemical, oil, gas, or water pipelines. More particularly, the present invention relates to a pipe assembly having a static mixer comprising a plurality of slots for mixing fluid flow within a fluid flow pipeline and also having a flow conditioner.

II. BACKGROUND OF THE INVENTION

Pipelines are used to transport fluids in various industries including, but not limited to, chemical, oil, gas, and manufacturing. Such industries use processes that require fluid flow parameters, such as gas composition, pressure, temperature, viscosity, and the like, to be accurately measured.

Further, pipelines often carry multiple fluids or multiple substances, for example, oil mixtures including heavy and light components. It is often necessary for multiple fluids to be mixed together so that accurate measurements may be taken.

Known static mixers, for example from KOMAX® and Statiflow, are large and can be difficult to construct and install. Static mixers from Westfall (e.g., mixer model 3050) may include vanes that require welding to a pipe wall.

III. SUMMARY OF THE INVENTION

The invention provides in a first embodiment a pipe assembly for flow measurement characterized by a fluid flow pipeline, a flow conditioner, and at least one static mixer. The flow conditioner and the at least one static mixer are disposed in the fluid flow pipeline in an orientation substantially perpendicular to a longitudinal axis of the fluid flow pipeline. The at least one static mixer is characterized by a body having a plurality of slots through the body, the slots having one or more sides that are angled with respect to an axis passing through a center of the body; and a plurality of arms extending from an outer edge of the body towards a center of the body. The plurality of slots comprises at least one concentric ring of slots.

The invention provides in a second embodiment further to any of the previous embodiments a pipe assembly characterized in that each arm has a flat surface on a first side of the body and angled sides along at least a portion thereof extending to a second side of the body.

The invention provides in a third embodiment further to any of the previous embodiments a pipe assembly characterized by two or more static mixers.

The invention provides in a fourth embodiment further to any of the previous embodiments a pipe assembly characterized by at least one pre-mixer upstream of at least one static mixer.

The invention provides in a fifth embodiment further to any of the previous embodiments a pipe assembly characterized in that one or more slots of the at least one static mixer comprise at least one chamfer extending from a first side of the body to a second side of the body.

The invention provides in a sixth embodiment further to any of the previous embodiments a pipe assembly characterized in that one or more slots of the at least one static mixer comprise at least one lip or flap that extends or curves inwardly from a side of the body.

The invention provides in a seventh embodiment further to any of the previous embodiments a pipe assembly characterized by a pre-mixer which is characterized by a body having a ring structure and comprising at least one first arm that extends across the ring structure, and a plurality of second arms extending from the ring structure to the at least one first arm, thereby forming a plurality of slots, each slot being angled with respect to an axis passing through a center of the body.

The invention provides in an eighth embodiment further to any of the previous embodiments a pipe assembly characterized in that a flow conditioner comprises a plate having a plurality of through holes arranged in one or more concentric rings.

The invention provides in a ninth embodiment further to any of the previous embodiments a pipe assembly characterized in that a flow conditioner is arranged about 3D to about 5D in front of at least one static mixer, wherein D is an internal diameter of the fluid flow pipeline.

The invention provides in a tenth embodiment further to any of the previous embodiments a pipe assembly characterized in that at least one pre-mixer and at least one static mixer are arranged about 1D apart, wherein D is an internal diameter of the fluid flow pipeline.

The invention provides in an eleventh embodiment further to any of the previous embodiments a pipe assembly characterized in that at least one pre-mixer and at least one static mixer are arranged in a sleeve.

The invention provides in a twelfth embodiment further to any of the previous embodiments a device to be installed in a pipeline characterized by at least one static mixer and at least one pre-mixer arranged in a sleeve. The at least one static mixer is characterized by a body having a plurality of slots through the body, the slots having one or more sides that are angled with respect to an axis passing through a center of the body; and a plurality of arms extending from an outer edge of the body towards a center of the body. The plurality of slots comprises at least one concentric ring of slots.

It is an object of the present invention to ensure proper mixing of fluid flow within a fluid flow pipeline and therefore to achieve proper performance of a sampling system.

An advantage of the mixer of the present invention is that the static mixer installs easily within a fluid flow pipeline.

Another advantage of the mixer of the present invention is that it takes up less space within a pipeline than known mixers.

As used herein "substantially", "relatively", "generally", "about", and "approximately" are relative modifiers intended to indicate permissible variation from the characteristic so modified (e.g., ±0.1%, ±0.5%, ±1.0%, ±2%, ±5%, ±10%, ±20%). They are not intended to be limited to the absolute value or characteristic which it modifies but rather approaching or approximating such a physical or functional characteristic.

In the detailed description, references to "one embodiment", "an embodiment", or "in embodiments" mean that the feature being referred to is included in at least one embodiment of the invention. Moreover, separate references to "one embodiment", "an embodiment", or "in embodiments" do not necessarily refer to the same embodiment; however, neither are such embodiments mutually exclusive, unless so stated, and except as will be apparent to those skilled in the art. Thus, the invention can include any variety of combinations and/or integrations of the embodiments described herein.

Given the following enabling description of the drawings, the devices, assemblies, and methods should become evident to a person of ordinary skill in the art.

IV. BRIEF DESCRIPTION OF THE DRAWINGS

FIG. 8B illustrates a perspective view of the mixer of FIG. 8A.

Figure 9B:
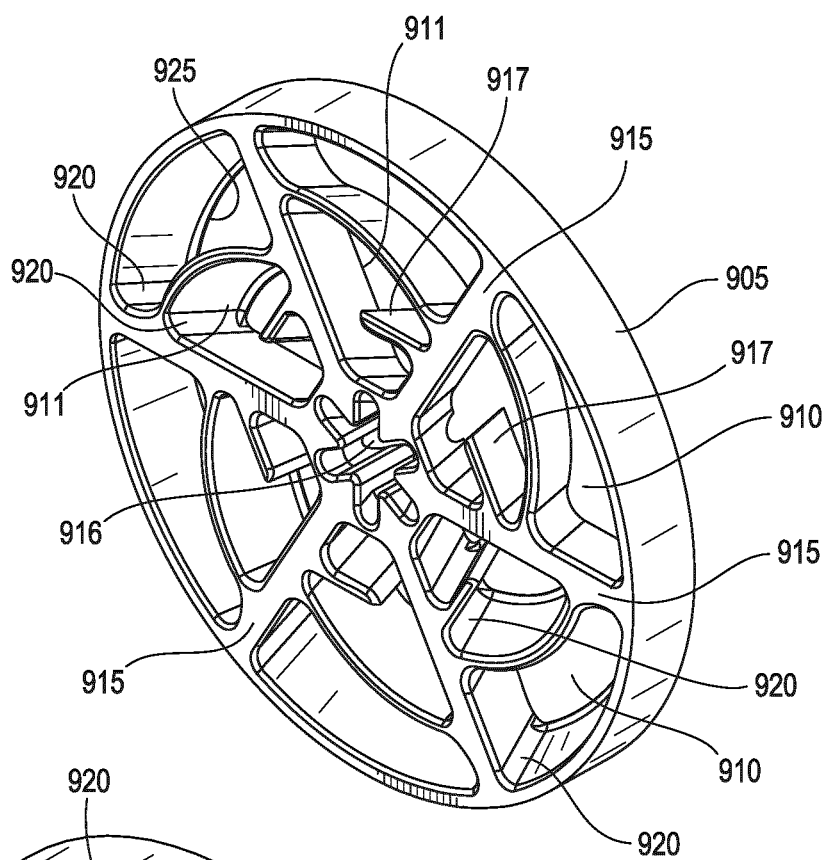
Figure 9C:
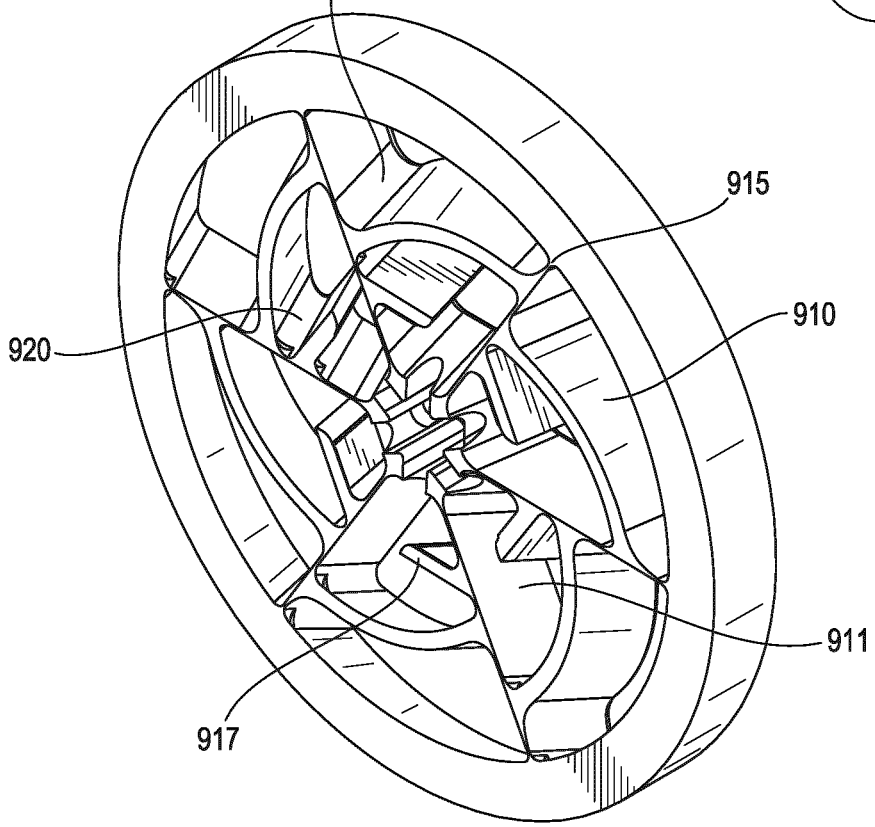
Figure 9D:
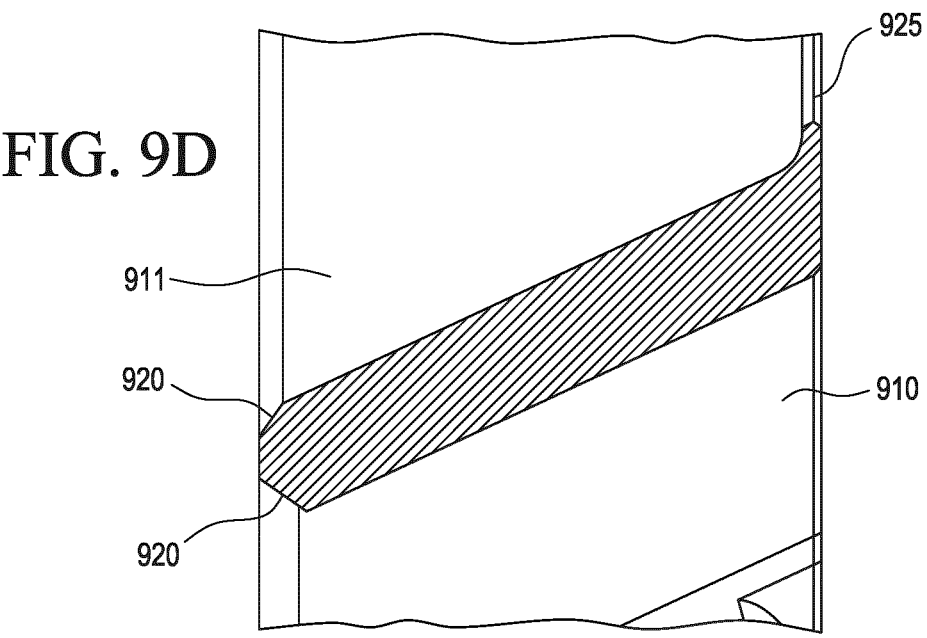

FIG. 9A illustrates a front view of a mixer according to a ninth embodiment of the present invention. FIG. 9B illustrates a front perspective view and FIG. 9C illustrates a rear perspective view of the mixer of FIG. 9A. FIG. 9D illustrates a cross-section view of the mixer of FIG. 9A.

Figure 10:
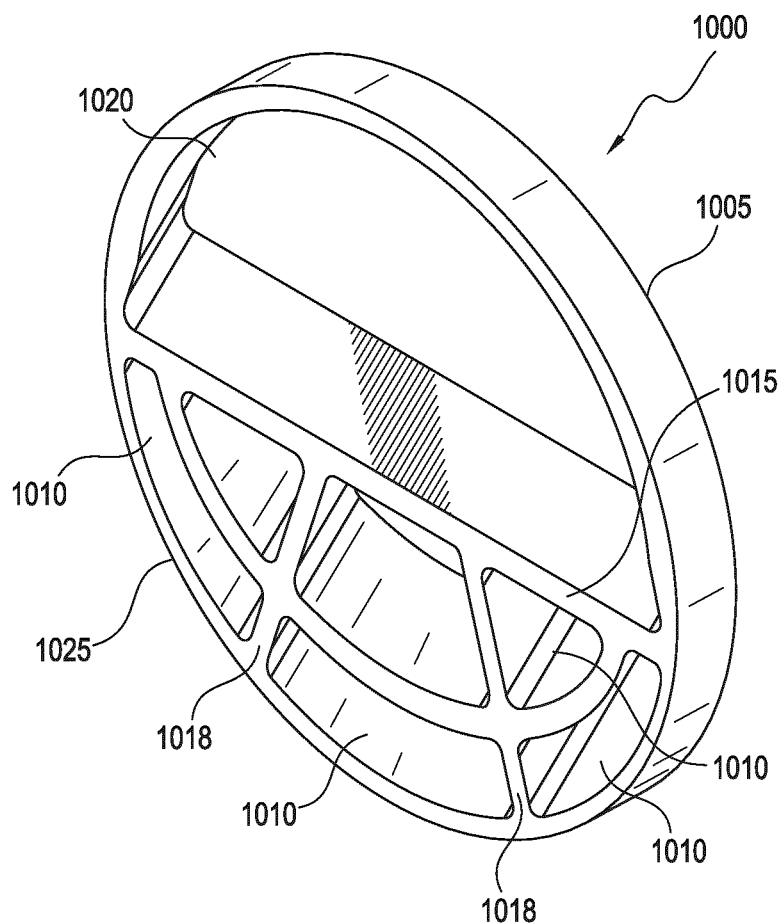

FIG. 10 illustrates a perspective view of a first embodiment of a pre-mixer according to the present invention.

Figure 11:
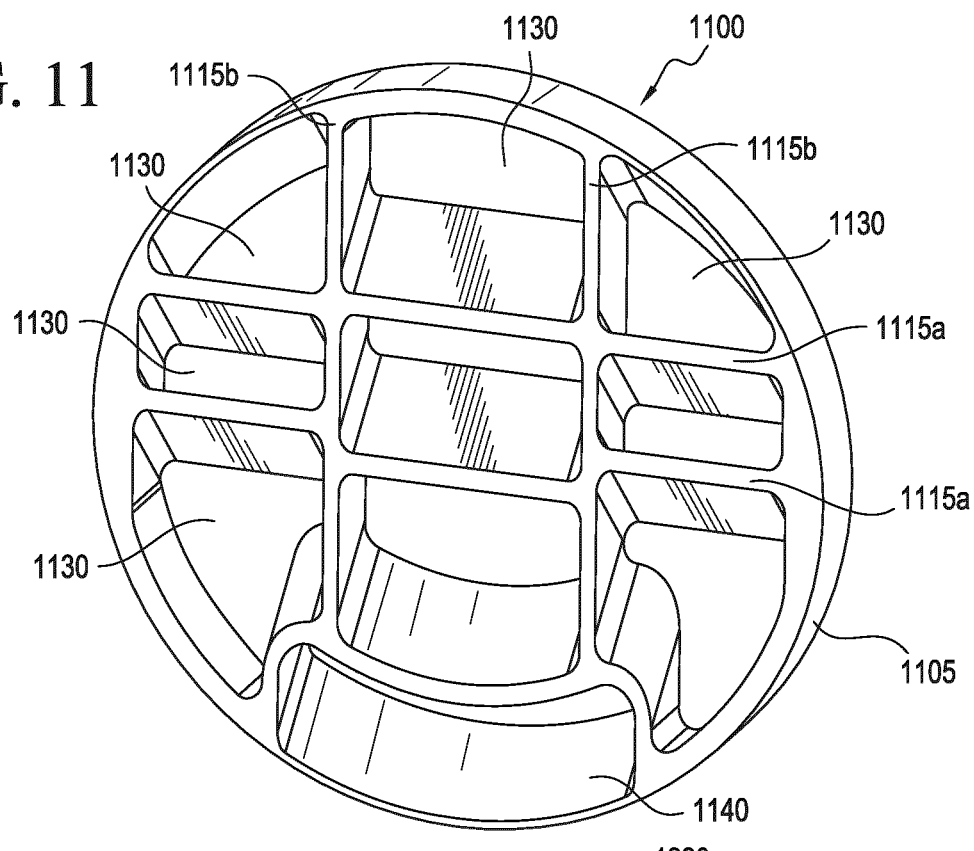

FIG. 11 illustrates a front view of a second embodiment of a pre-mixer according to the present invention.

Figure 12A:
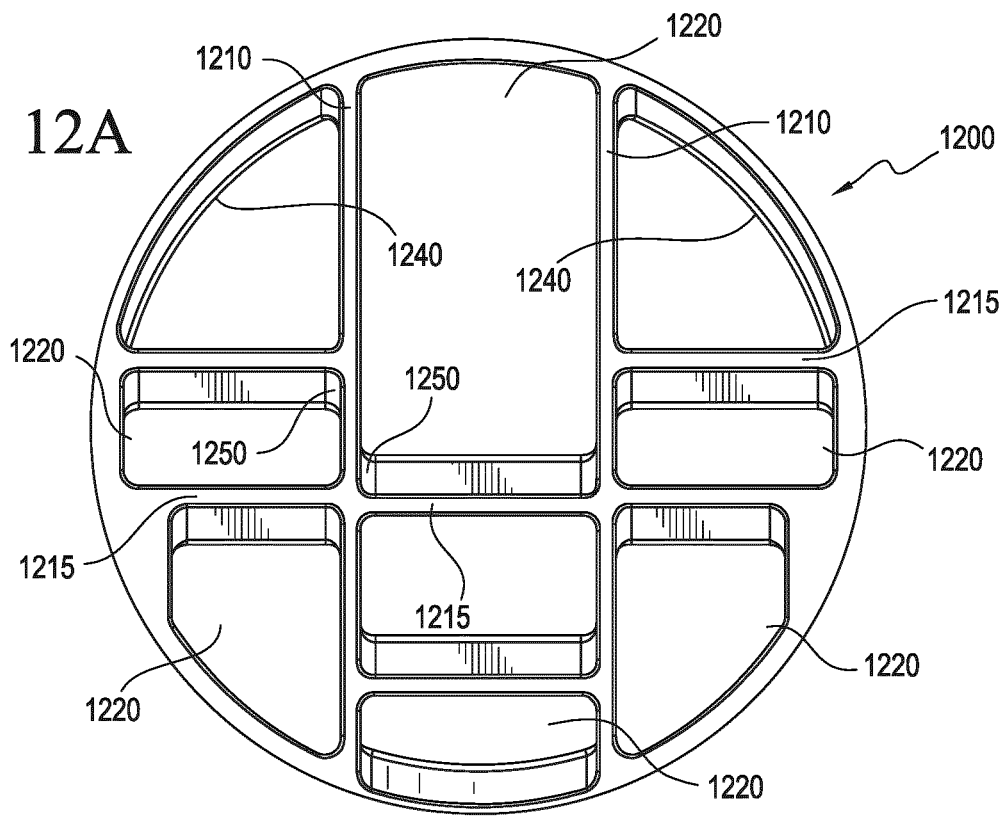
Figure 12B:
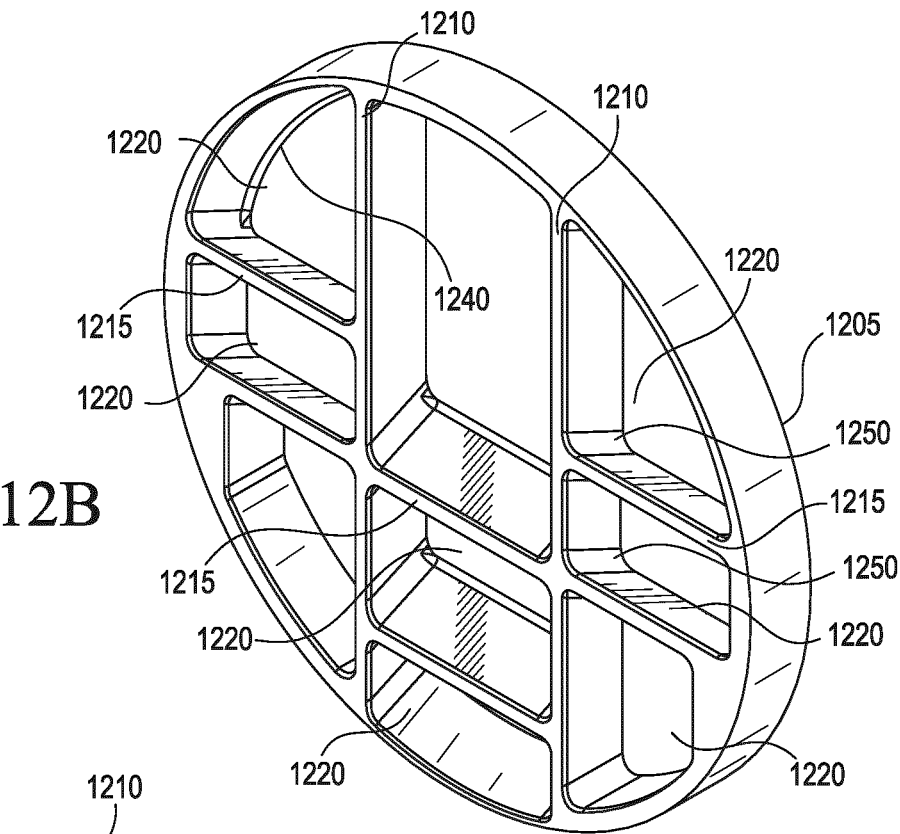
Figure 12C:
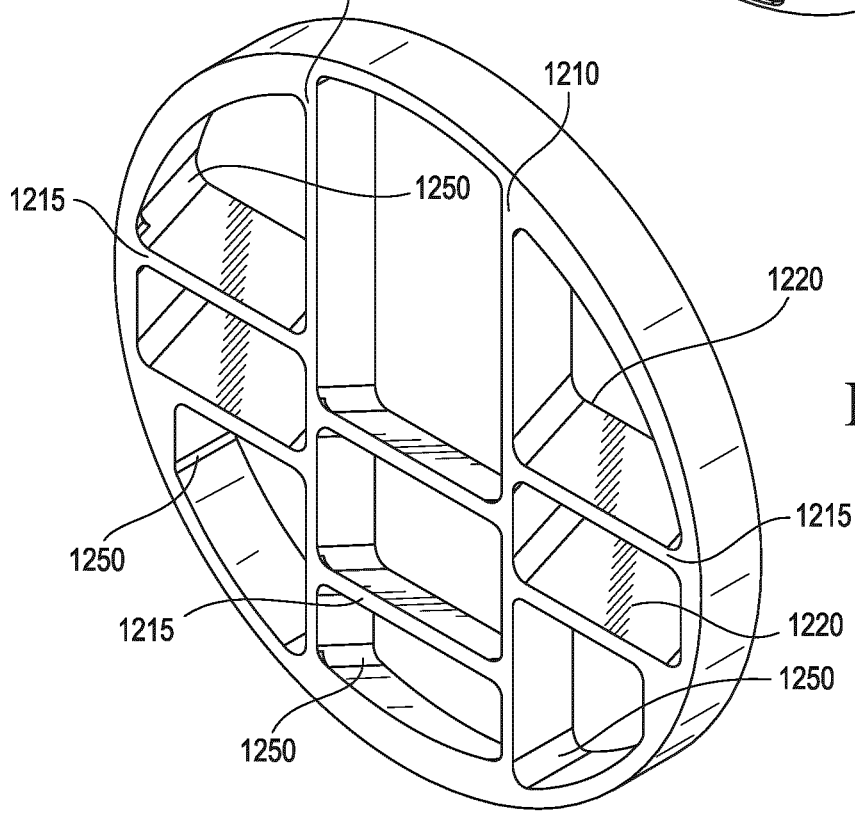

FIG. 12A illustrates a front view of a third embodiment of a pre-mixer according to the present invention. FIG. 12B illustrates a front perspective view and FIG. 12C illustrates a rear perspective view of the pre-mixer of FIG. 12A.

Figure 13:
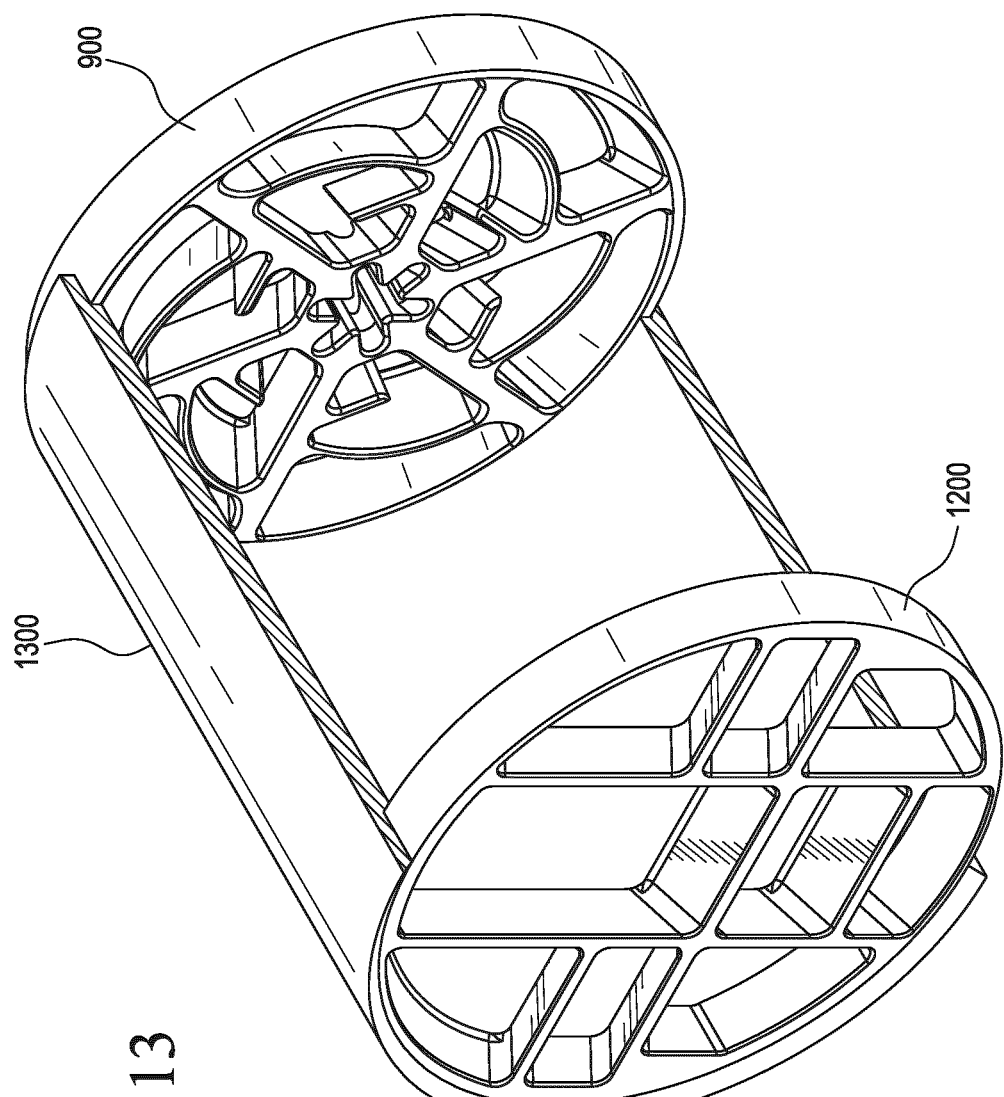

FIG. 13 illustrates a schematic view of a sleeve (cut-away view) including the mixer of FIG. 9A and the pre-mixer of FIG. 12A to be installed in a fluid flow pipe according to one embodiment of the present invention.

Figure 14:
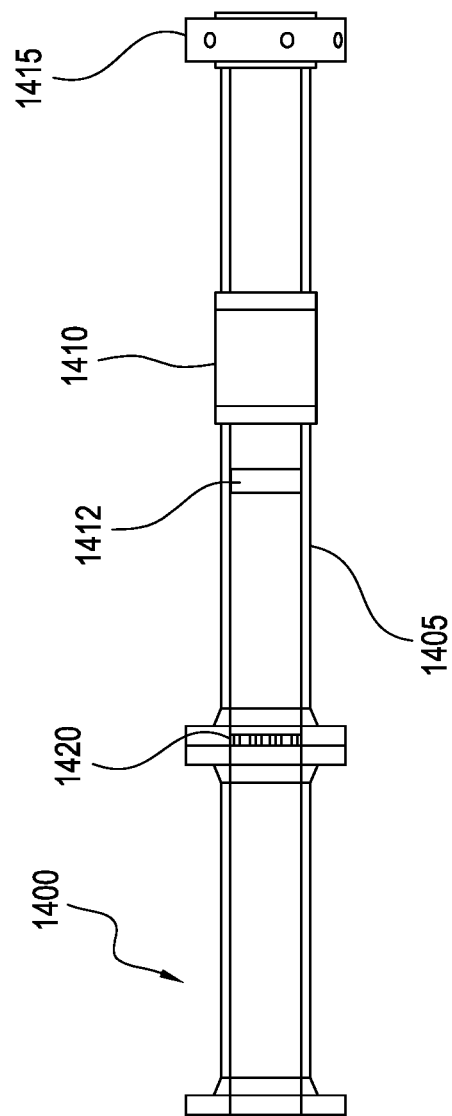

FIG. 14 illustrates a schematic view of a pipe assembly including a fluid flow pipe with a mixer according to the present invention.

Given the following enabling description of the drawings, the methods and systems should become evident to a person of ordinary skill in the art.

V. DETAILED DESCRIPTION OF THE INVENTION

A static mixer according to the present invention may be utilized for mixing fluid flow, for example, in at least one of chemical, oil, gas, or water pipelines. The static mixer may be made according to typical manufacturing methods including, but not limited to, welding, threading, fit interference, or using fasteners such as bolts, screws, adhesives, or the like. In a specific embodiment, the entire static mixer may be machined out of the same material to provide a unitary, integral structure.

According to the present invention, the static mixer comprises a body or disk having a plurality of slots or cutouts for mixing fluid flow within a pipeline. The body or disk comprising the plurality of slots may be in the form of a circular or ring structure.

The slots may be of any desired shape, having one or more sides that are straight, curved, wavy, or a combination thereof. In a specific embodiment, the plurality of slots may comprise a series of slots in close proximity to one another, thereby forming an array or cascade. For example, the plurality of slots may comprise 1 to 4 concentric rings of slots. The slots or cutouts are sometimes referred to as vanes.

According to the present invention, each slot is angled with respect to an axis passing through a center of the body (i.e., a longitudinal axis of a pipeline in which the static mixer is installed). The slots may have one or more sides that are angled at 20-50°, for example 25-45°, with respect to an axis passing through a center of the body. The slots in the body may be oriented at the same angle or may be oriented at differing angles from one another.

The static mixer includes a plurality of arms extending from an outer edge of the body towards a center of the body. The arms may connect with each other in a center of the body or, in specific embodiments, there may be a hole in the central region of the body.

In specific embodiments, one or more arms may have a flat or blunt surface on a first side (e.g., front or upstream side) of the body and angled sides extending along at least a portion thereof towards a second side (e.g., rear or downstream side) of the body. Thus, in specific embodiments, one or more arms may be in the form of a triangular wedge. The angled sides may form a part or a side of an inner concentric ring of slots and/or an outer concentric ring of slots. In embodiments, a static mixer may have from 4 to 8 arms. In specific embodiments, each slot may be located between two arms.

The static mixer may be scaled in size in relation to a fluid flow pipeline in which it is to be installed. In embodiments, the static mixer may have a thickness of less than 10-20% of the inner pipe diameter (D) in which the mixer is installed, for example 12-15% D. Thus, in embodiments when an inner pipe diameter is from 2 to 20 inches (5.1 to 51 cm), the thickness of the static mixer may be about 0.24 to 3 inches (0.6 to 7.62 cm).

The static mixer may be installed within a pipeline carrying a fluid flow. The static mixer may be installed at an orientation that is substantially perpendicular to a longitudinal axis of the pipeline. As fluid flow passes through the static mixer, the slots impart rotating and turbulent flow to the fluid(s), thereby encouraging mixing of the fluid(s). The static mixer causes the fluid composition in a center of the pipeline to become an accurate representative sample of the fluid in the pipeline as a whole. In specific embodiments, a fluid flow pipeline may carry two or more fluids, for example, light and heavy gas fluids.

The present invention is also directed to a pre-mixer for mixing fluid flow in a pipeline. The pre-mixer may comprise a body having a circular or ring structure. At least one first arm extends across the ring structure. A plurality of second arms extends from the ring structure to the at least one first arm, thereby forming a plurality of slots. According to the present invention, each slot is angled with respect to an axis passing through a center of the body (i.e., a longitudinal axis of a pipeline in which the pre-mixer is installed).

A pre-mixer may be used in conjunction with any other mixer, for example, any of the static mixers according to the present invention. In a particular embodiment, a pre-mixer may be installed upstream of a static mixer. Alternatively, the pre-mixer may be used itself for mixing fluid flow in a pipeline. Due to its configuration, the pre-mixer may be useful in mixing fluids in which material has settled towards a bottom of a fluid flow pipeline, thereby diverting such settled matter in an upward direction.

Static Mixer

Figure 1A:
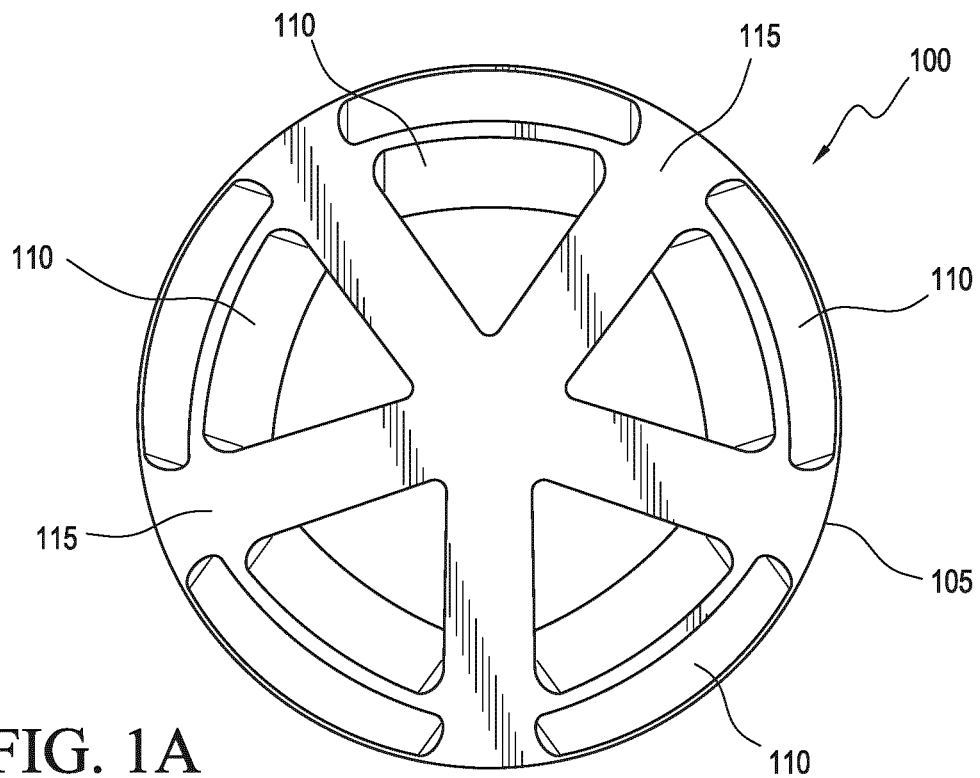
FIG. 1A illustrates a front view of a mixer according to a first embodiment of the present invention.
Figure 1B:
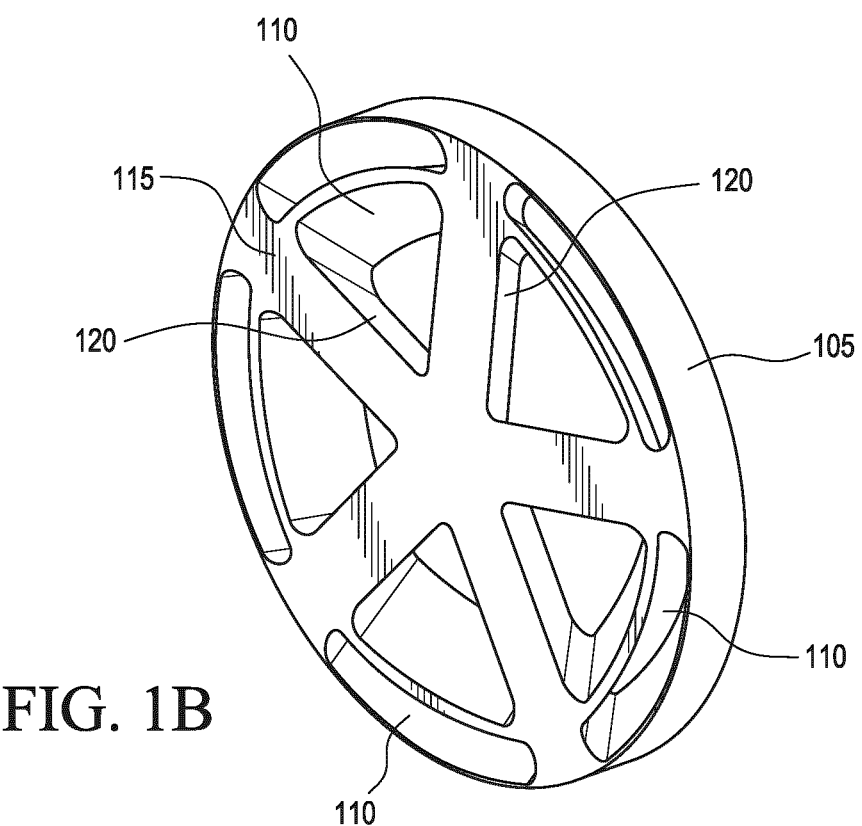
FIG. 1B illustrates a perspective view and FIG. 1C illustrates a rear view of the mixer of FIG. 1A.
Figure 1C:
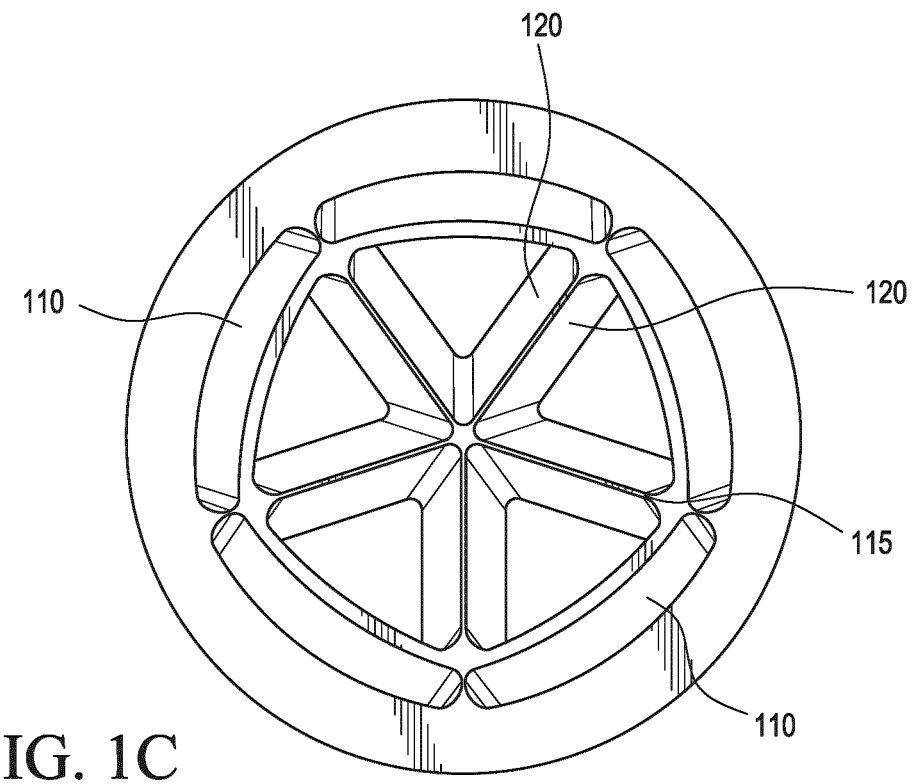

FIG. 1A illustrates a front view of a mixer 100 for mixing fluid flow according to one embodiment of the present invention. The mixer comprises a body 105 having a circular or ring structure. The body comprises a plurality of slots 110, each slot being angled with respect to an axis passing through a center of the body. The slots 110 comprise an inner concentric ring of slots and an outer concentric ring of slots. A plurality of arms 115 extend from an outer edge or side of the body towards and connect at a center of the body (in a central region). Each of the plurality of arms 115 has a flat surface on a first side of the body 105 and angled sides 120 extending along at least a portion thereof to a second side of the body 105 (FIGS. 1B-1C). The angled sides 120 form sides or part of the inner concentric ring of slots. The respective slots 110 are located between two arms 115 on at least a first side of the body. FIG. 1B illustrates a perspective view of the mixer of FIG. 1A. FIG. 1C illustrates a rear view of the mixer of FIG. 1A.

Figure 2A:
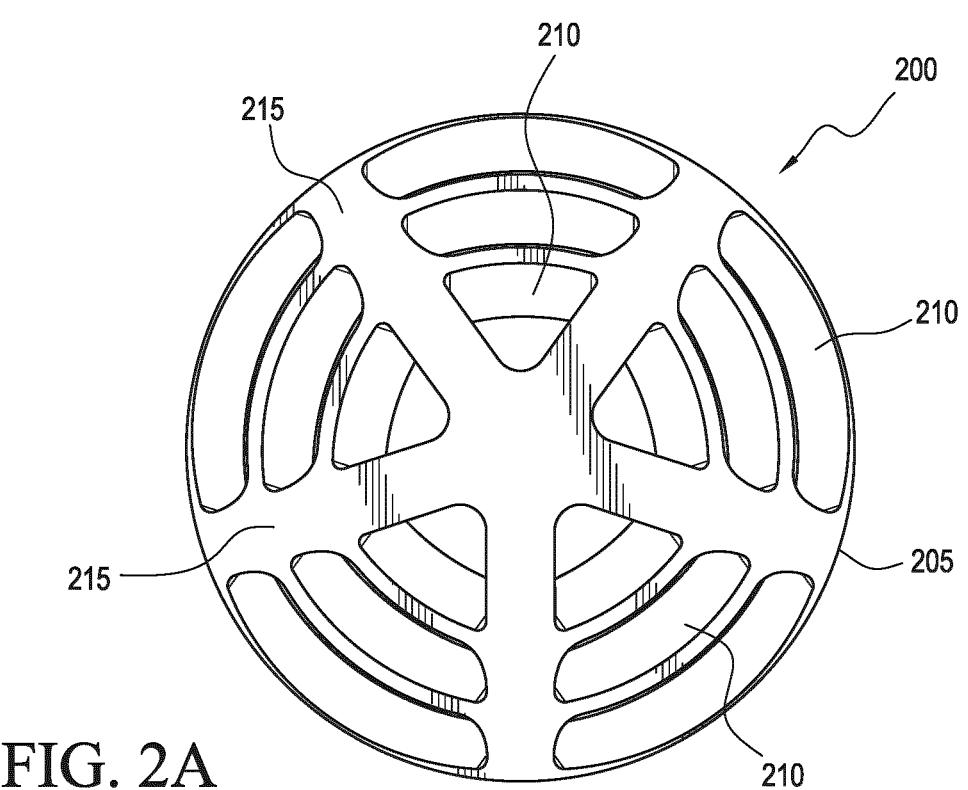
FIG. 2A illustrates a front view of a mixer according to a second embodiment of the present invention.
Figure 2B:
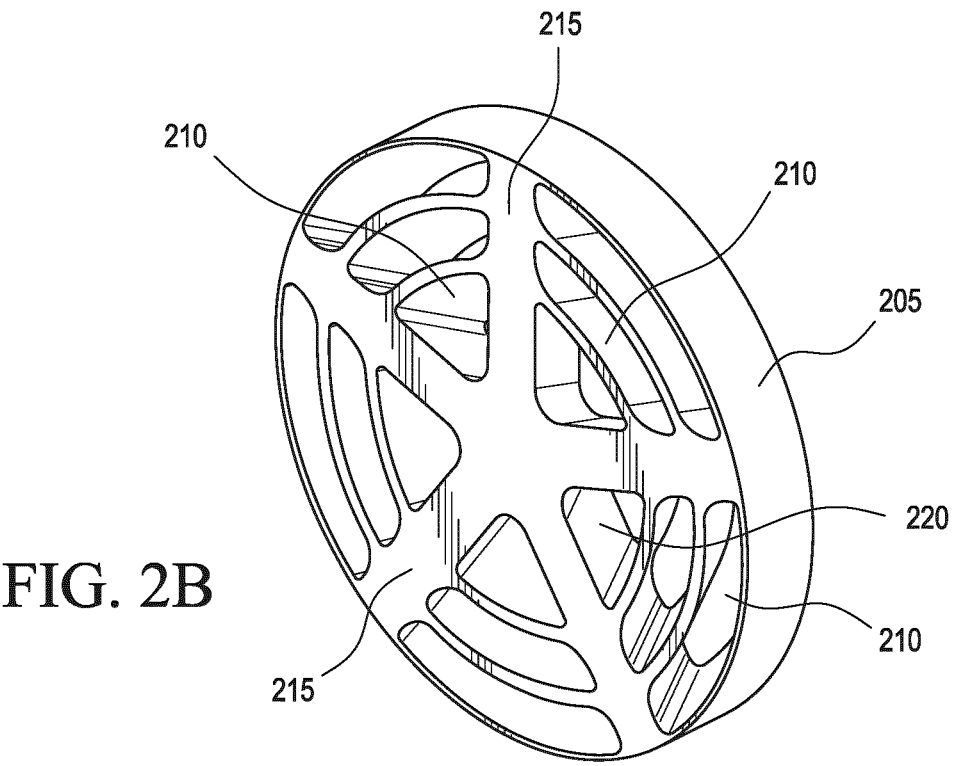
FIG. 2B illustrates a perspective view and FIG. 2C illustrates a rear view of the mixer of FIG. 2A.
Figure 2C:
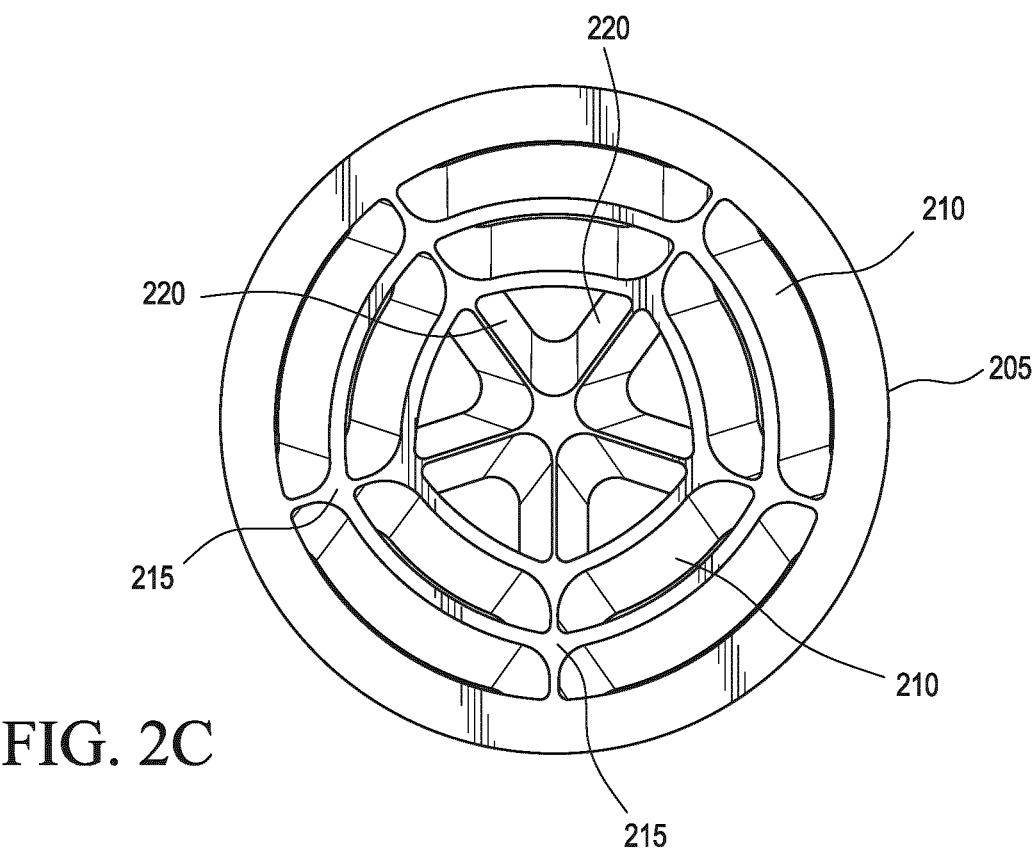

FIG. 2A illustrates a front view of mixer 200 according to a second embodiment of the present invention. The mixer comprises a body 205 having a circular or ring structure. The body comprises a plurality of slots 210 forming three concentric rings of slots in the form of an array or cascade. Each slot 210 is angled with respect to an axis passing through a center of the body. A plurality of arms 215 extend from an outer edge or side of the body towards and connect at a center of the body. Each of the plurality of arms 215 has a flat surface on a first side of the body 205 and angled sides 220 extending along at least a portion thereof to a second side of the body 205 (FIGS. 2B-2C). The angled sides 220 form sides or part of the inner concentric ring of slots. The respective slots 210 are located between two arms 215 on at least a first side of the body. FIG. 2B illustrates a perspective view of the mixer of FIG. 2A. FIG. 2C illustrates a rear view of the mixer of FIG. 2A.

Figure 3A:
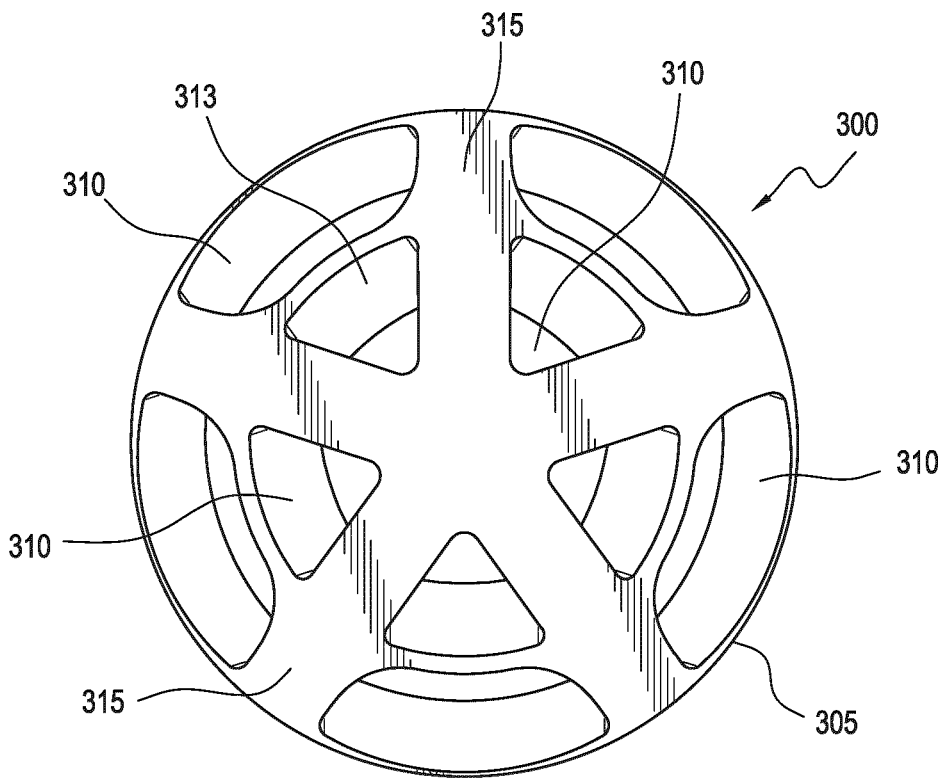
FIG. 3A illustrates a front view of a mixer according to a third embodiment of the present invention.
Figure 3B:
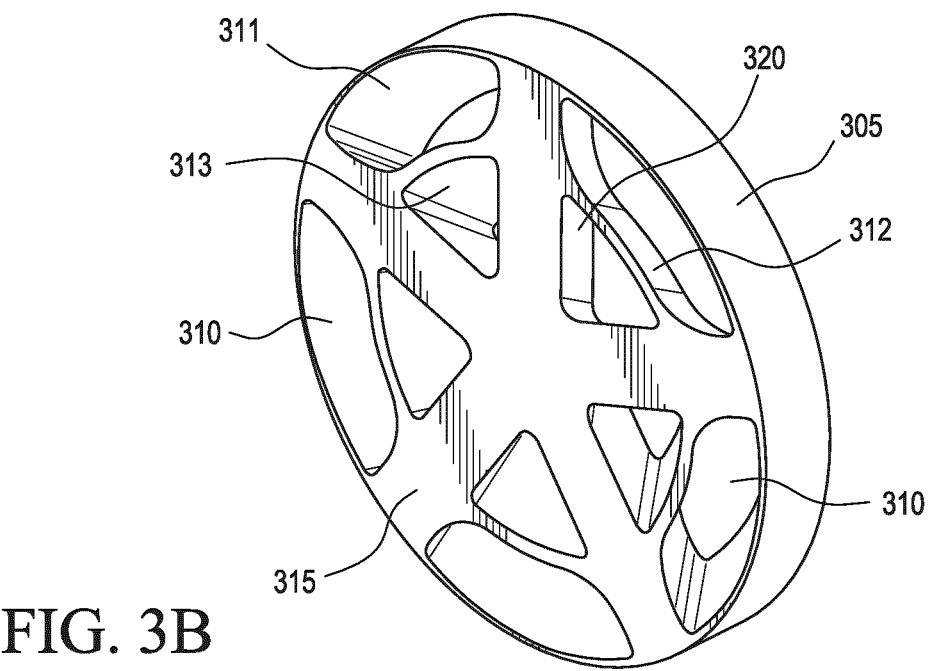
FIG. 3B illustrates a perspective view and FIG. 3C illustrates a rear view of the mixer of FIG. 3A.
Figure 3C:
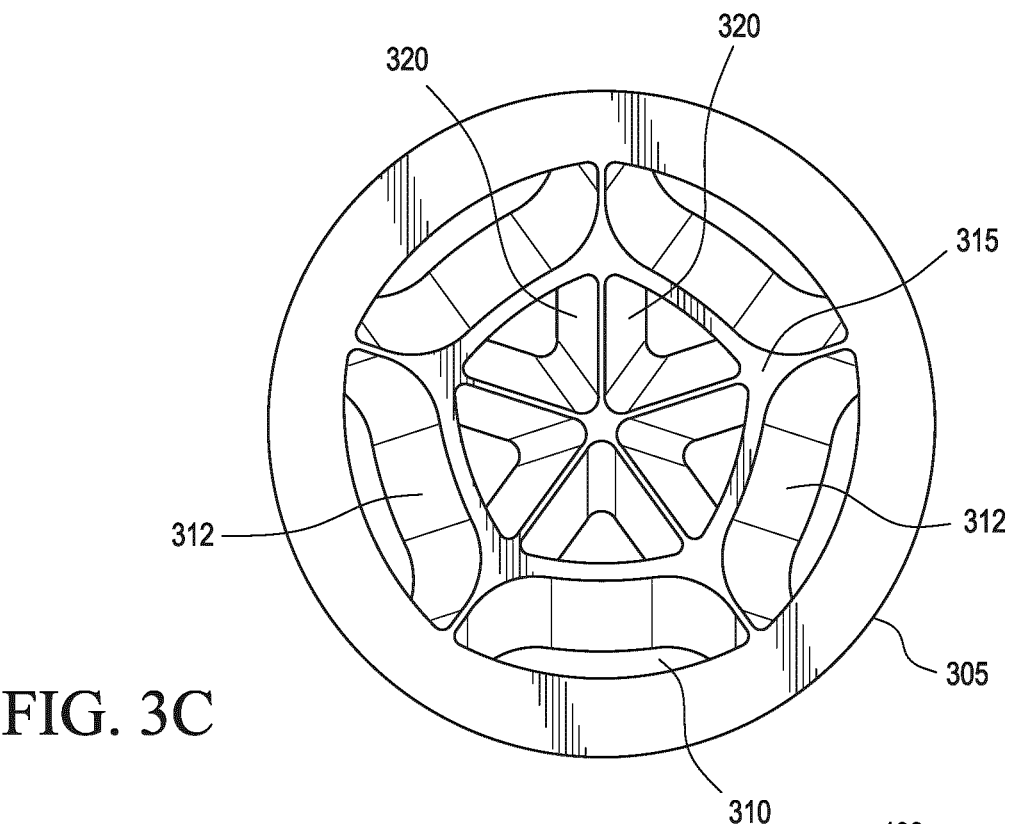

FIG. 3A illustrates a front view of a mixer 300 according to a third embodiment of the present invention. The mixer comprises a body 305 having a circular or ring structure. The body comprises a plurality of slots 310 comprising an inner concentric ring of slots and an outer concentric ring of slots. The slots 310 are angled with respect to an axis through a center of the body. Slots 310 forming the outer concentric circle have a first curved side 311 and a second wavy side 312 (FIGS. 3B-3C); inner slots 310 have a curved side 313. A plurality of arms 315 extend from an outer edge or side of the body towards and connect at a center of the body. Each of the plurality of arms 315 has a flat surface on a first side of the body and angled sides 320 along at least a portion thereof extending to a second side of the body (FIG. 3C). The angled sides 320 form sides or part of the inner concentric ring of slots. Respective slots 310 are located between two arms 315 on at least a first side of the body. FIG. 3B illustrates a perspective view of the mixer of FIG. 3A. FIG. 3C illustrates a rear view of the mixer of FIG. 3A.

Figure 4A:
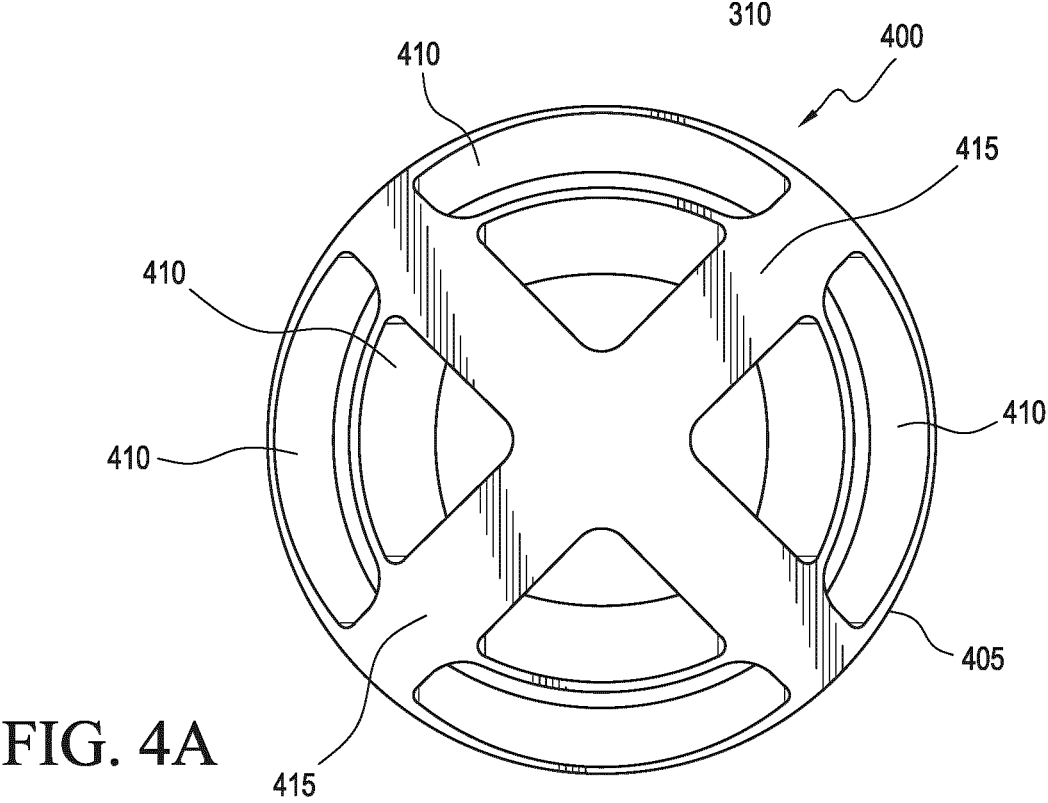
FIG. 4A illustrates a front view of a mixer according to a fourth embodiment of the present invention.
Figure 4B:
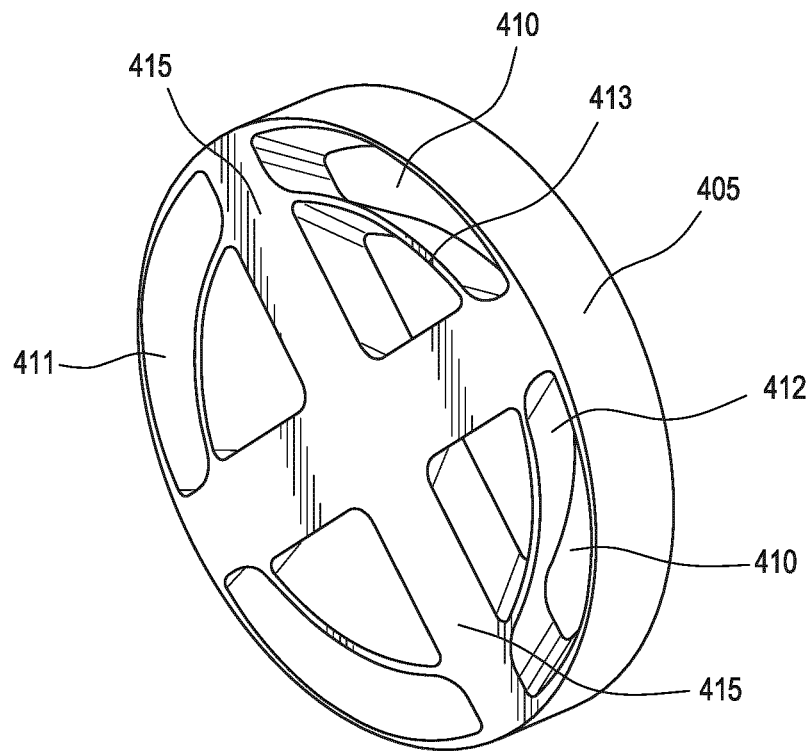
FIG. 4B illustrates a perspective view and FIG. 4C illustrates a rear view of the mixer of FIG. 4A.
Figure 4C:
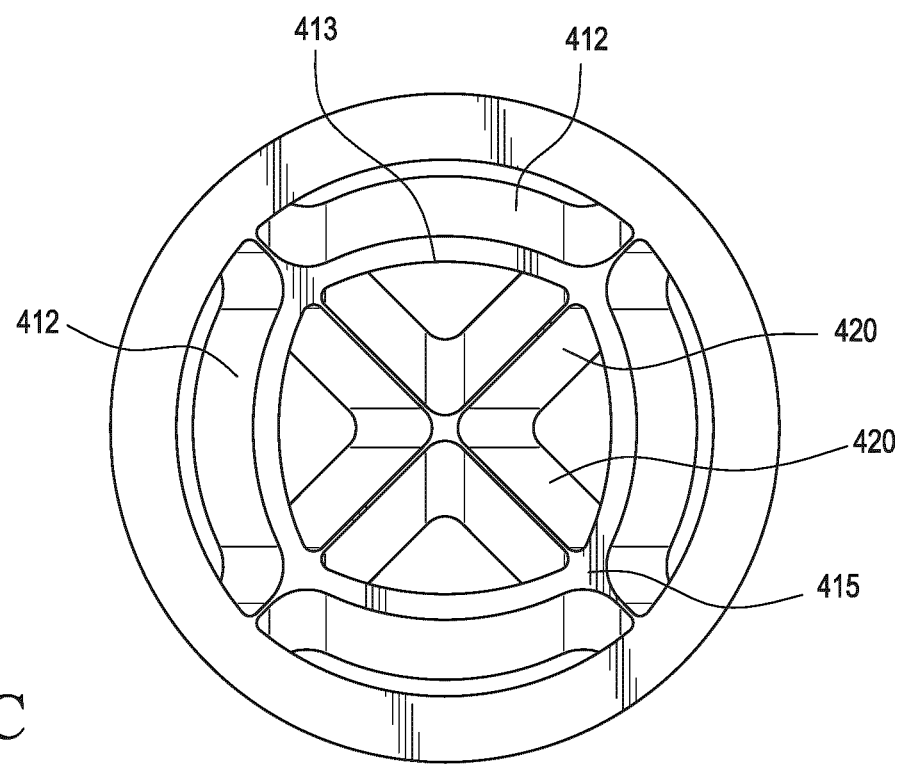

FIG. 4A illustrates a front view of a first side of a mixer 400 according to a fourth embodiment of the present invention. The mixer comprises a body 405 having a circular or ring structure. The body comprises a plurality of slots 410 forming an inner concentric ring of slots and an outer concentric ring of slots. The slots are angled with respect to an axis through a center of the body. Slots 410 forming the outer concentric circle have a first curved side 411 and a second wavy side 412 (FIGS. 4B-4C); the inner concentric ring of slots 410 have a curved side 413. A plurality of arms 415 extend from an outer edge or side of the body towards and connect at a center of the body. Each of the plurality of arms 415 has a flat surface on a first side of the body 405 and angled sides 420 along at least a portion thereof extending to a second side of the body (FIG. 4C). The angled sides 420 form sides or part of the inner concentric ring of slots. Respective slots 410 are located between two arms 415 on at least a first side of the body. FIG. 4B illustrates a perspective view of the mixer of FIG. 4A. FIG. 4C illustrates a rear view of the mixer of FIG. 4A.

Figure 5A:
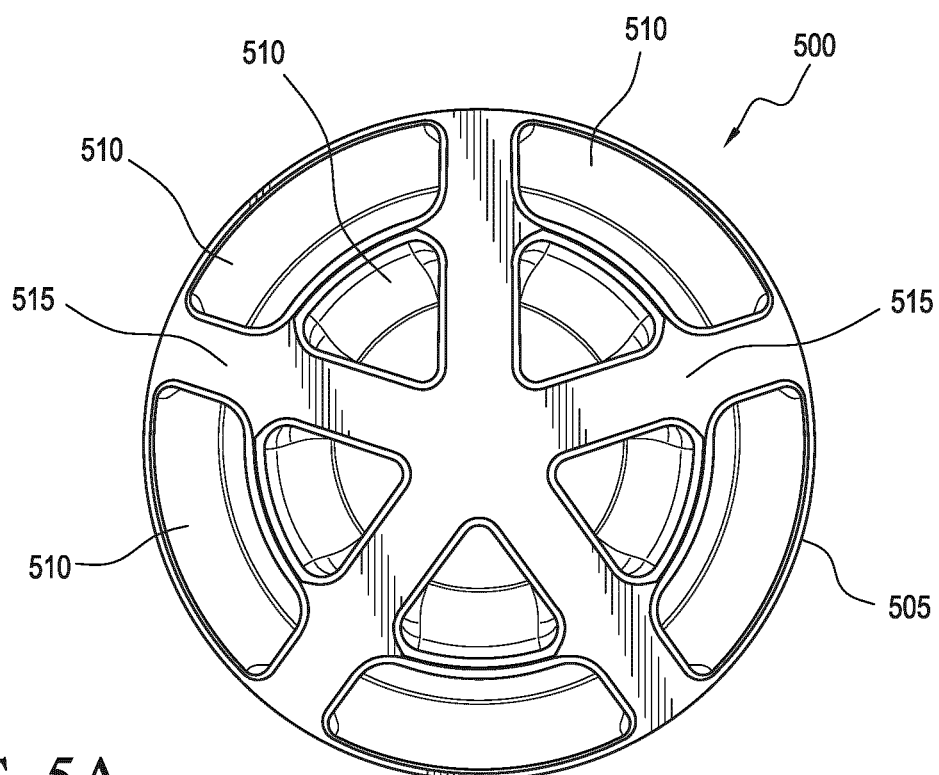
FIG. 5A illustrates a front view of a mixer according to a fifth embodiment of the present invention.
Figure 5B:
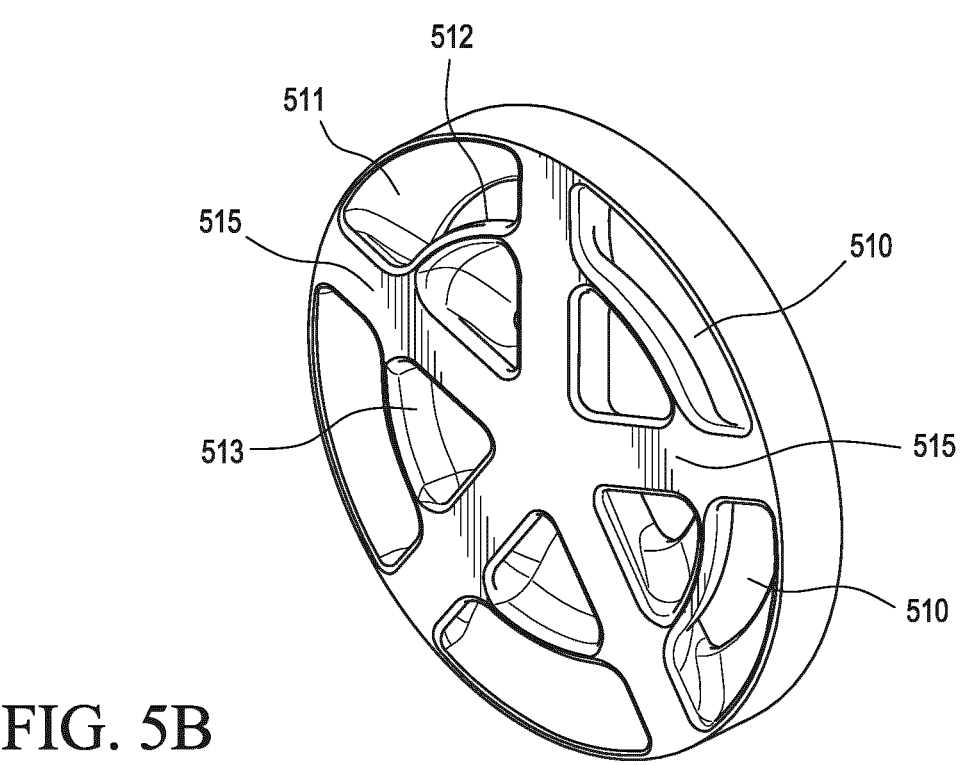
FIG. 5B illustrates a perspective view and FIG. 5C illustrates a rear view of the mixer of FIG. 5A.
Figure 5C:
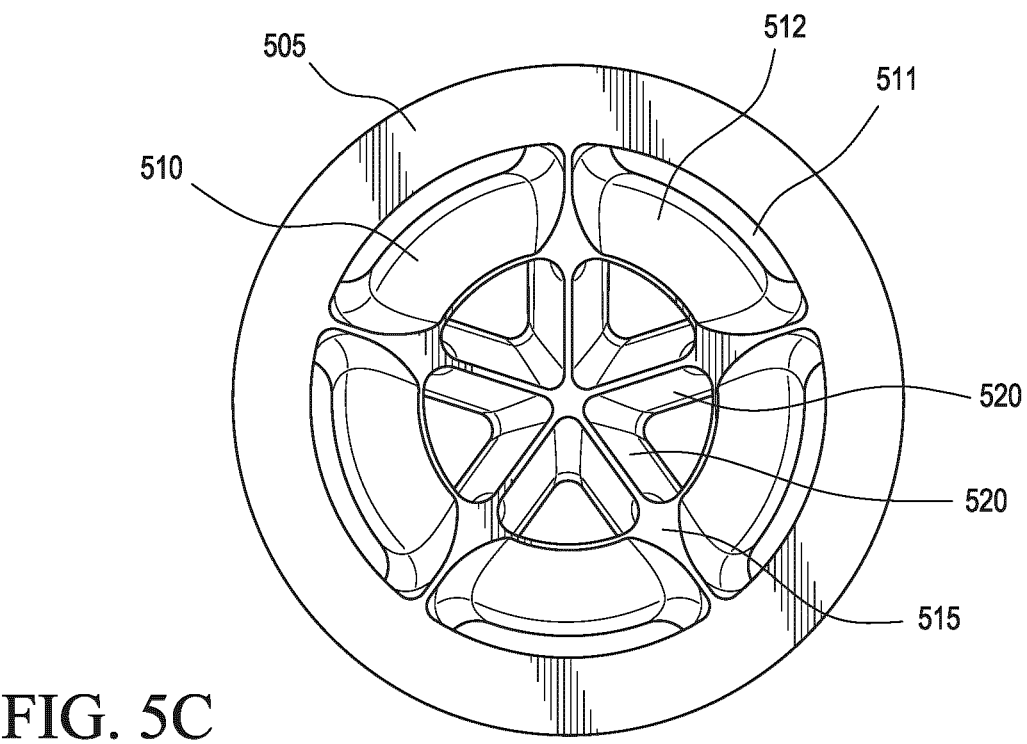

FIG. 5A illustrates a front view of a mixer 500 according to a fifth embodiment of the present invention. The mixer comprises a body 505 having a circular or ring structure. The body comprises a plurality of slots 510 forming an inner concentric ring of slots and an outer concentric ring of slots. The slots are angled with respect to an axis through a center of the body. The slots forming the outer concentric ring have a first concave shaped side 511 and a second wavy side 512; the inner concentric ring of slots have a concave side 513 (FIGS. 5B-5C). A plurality of arms 515 extend from an outer edge or side of the body towards and connect at a center of the body. Each of the plurality of arms 515 has a flat surface on a first side of the body and angled sides 520 along at least a portion thereof extending to a second side of the body (FIG. 5C). The angled sides 520 form sides or part of the inner concentric ring of slots. Respective slots 510 are located between two arms 515 on at least a first side of the body. FIG. 5B illustrates a perspective view of the mixer of FIG. 5A. FIG. 5C illustrates a rear view of the mixer of FIG. 5A.

Figure 6A:
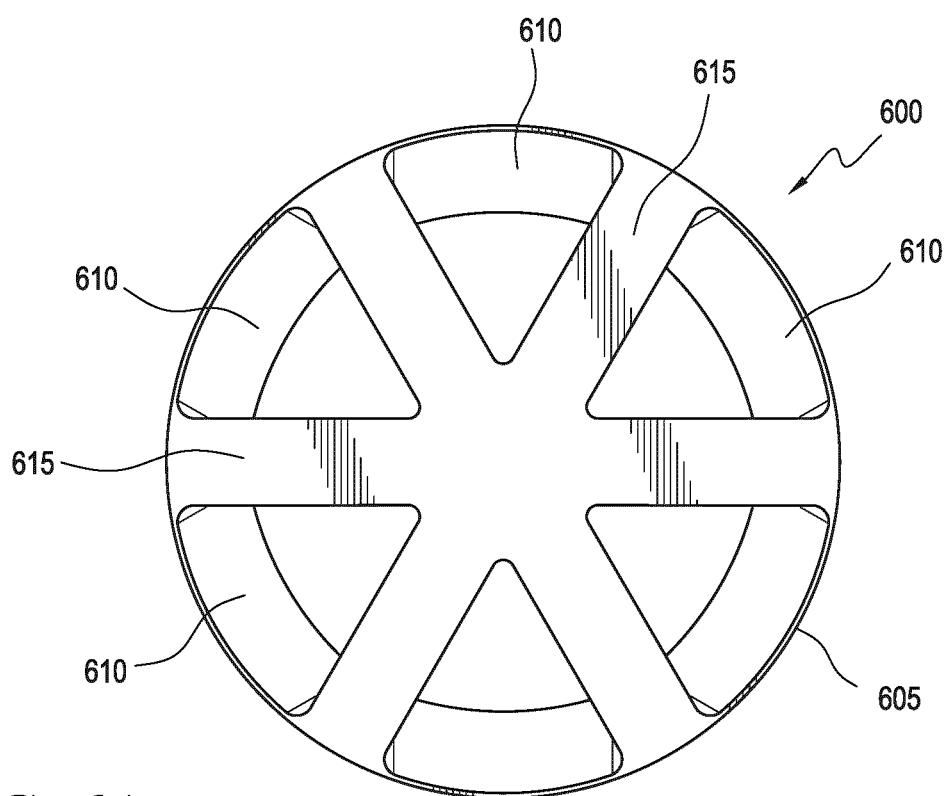
FIG. 6A illustrates a front view of a mixer according to a sixth embodiment of the present invention.
Figure 6B:
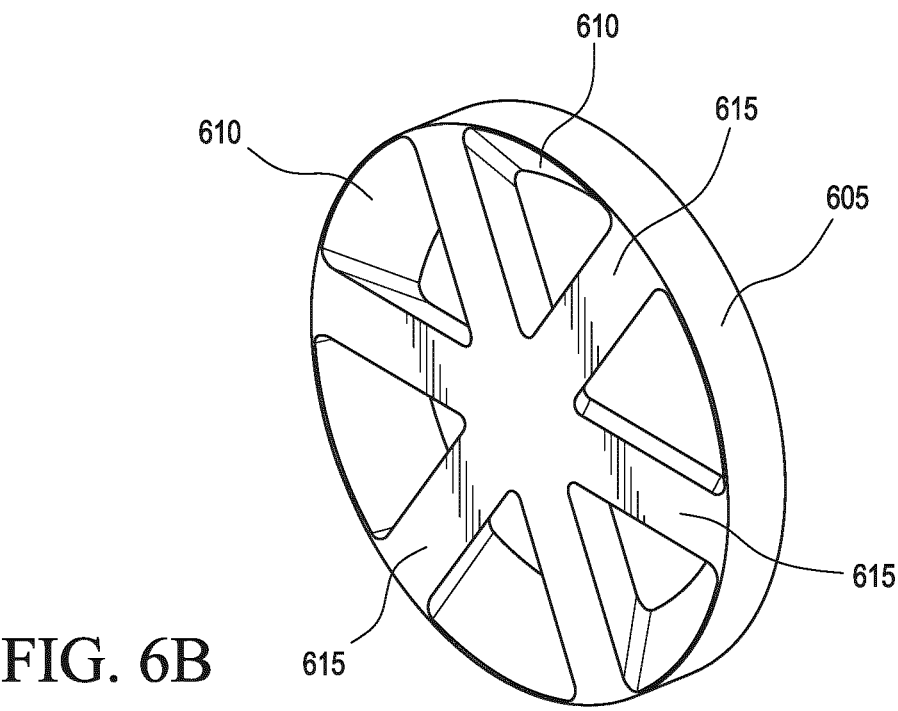
FIG. 6B illustrates a perspective view and FIG. 6C illustrates a rear view of the mixer of FIG. 6A.
Figure 6C:
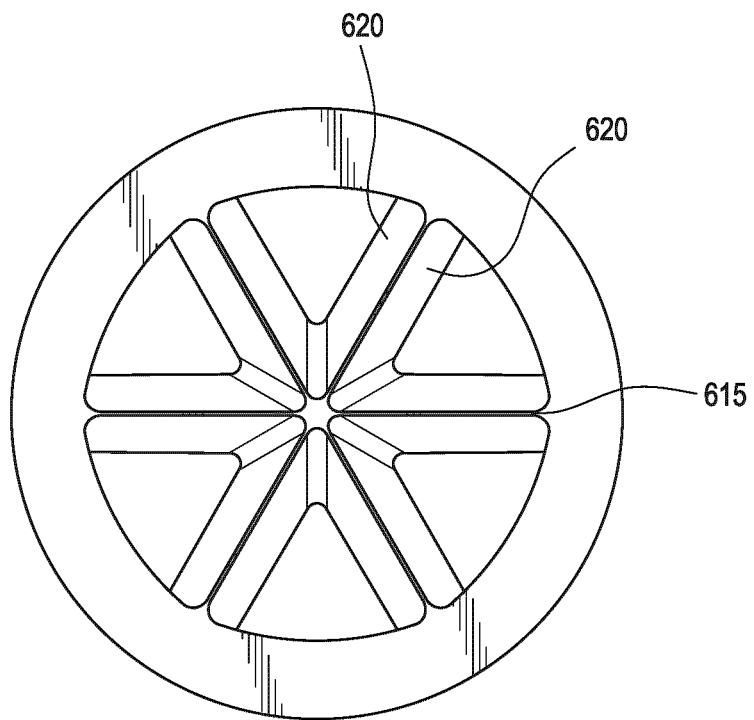

FIG. 6A illustrates a front view of a mixer 600 according to a sixth embodiment of the present invention. The mixer comprises a body 605 having a circular or ring structure. A plurality of arms 615 extend from an outer edge or side of the body towards and connect at a center of the body. Each of the plurality of arms 615 has a flat surface on a first side of the body and angled sides 620 along at least a portion thereof extending to a second side of the body (FIG. 6C). The mixer comprises a plurality of slots 610 forming one concentric ring, each slot being partially defined by a portion of the ring structure that is angled with respect to an axis through a center of the body. FIG. 6B illustrates a perspective view of the mixer of FIG. 6A. FIG. 6C illustrates a rear view of the mixer of FIG. 6A.

Figure 7:
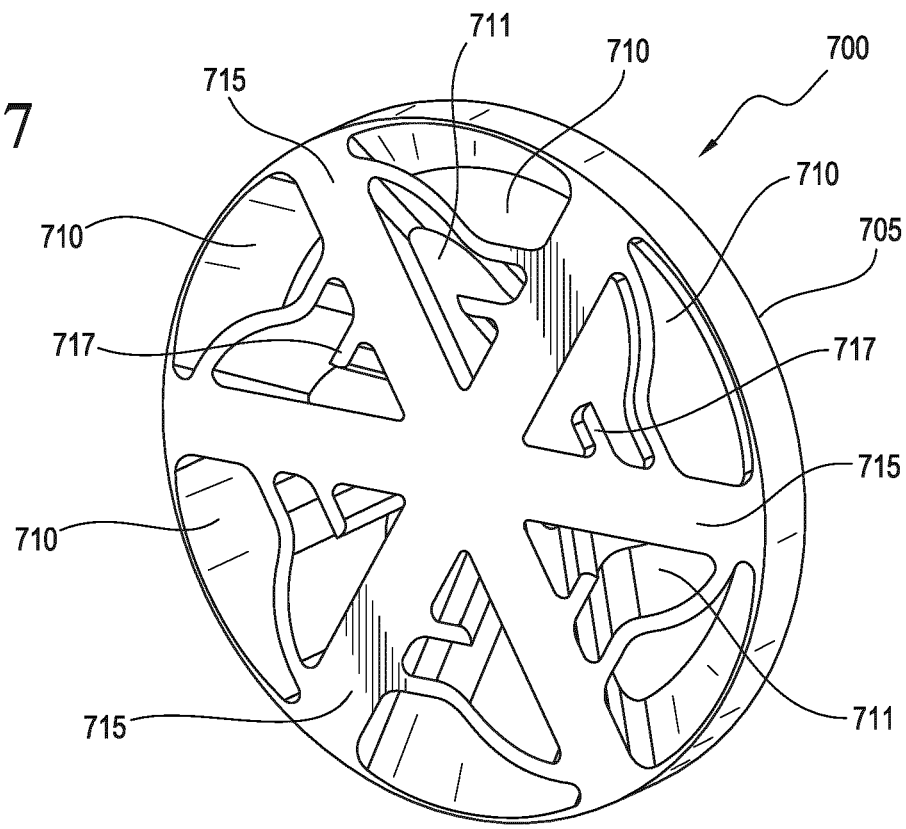
FIG. 7 illustrates a perspective view of a mixer according to a seventh embodiment of the present invention.

FIG. 7 illustrates a perspective view of a mixer 700 according to a seventh embodiment of the present invention. The mixer comprises a body 705 having a circular or ring structure. The body comprises a plurality of slots forming an inner concentric ring of slots 711 and an outer concentric ring of slots 710. Each slot is angled with respect to an axis passing through a center of the body. A plurality of arms 715 extend from an outer edge or side of the body towards and connect at a center of the body. The slots 710 have a curved side and an opposing wavy side. The slots 711 have a substantially triangular shape with a protrusion 717 from one of the arms 715 extending into the slot. Each of the plurality of arms 715 has a flat surface on a first side of the body and may have angled sides extending along at least a portion thereof to a second side of the body. The slots 710, 711 are located between two arms 715 on at least a first side of the body.

Figure 8A:
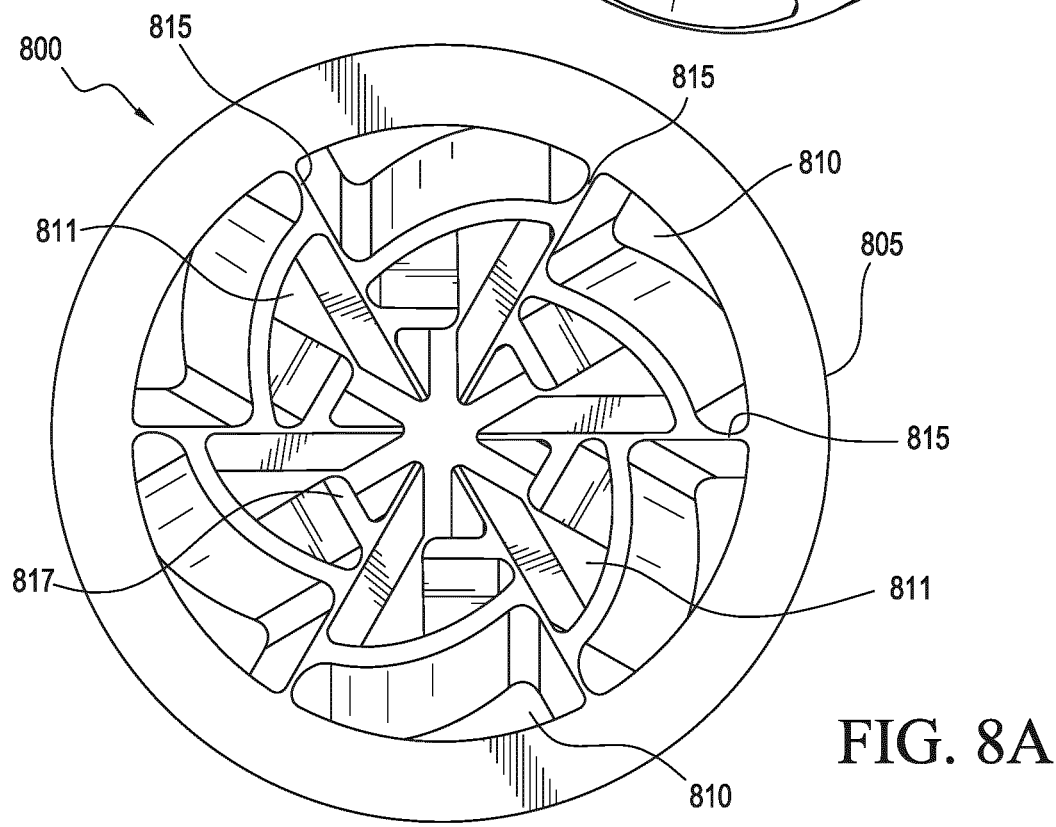
FIG. 8A illustrates a rear view of a mixer according to an eighth embodiment of the present invention.

FIG. 8A illustrates a rear view of a mixer 800 according to an eighth embodiment of the present invention. The mixer comprises a body 805 having a circular or ring structure. The body comprises a plurality of slots forming an inner concentric ring of slots 811 and an outer concentric ring of slots 810. Each slot is angled with respect to an axis passing through a center of the body. A plurality of arms 815 extend from an outer edge or side of the body towards a center of the body, but do not connect or intersect in the center. The slots 810 have curved sides. The slots 811 have a substantially triangular shape with a protrusion 817 from one of the arms 815 extending into the slot. Each of the plurality of arms 815 has a flat surface on a first side of the body and may have angled sides extending along at least a portion thereof to a second side of the body. Respective slots 810, 811 are located between two arms 815 on at least a first side of the body. FIG. 8B is a rear perspective view of the mixer of FIG. 8A.

FIG. 9A illustrates a front view of a mixer 900 according to a ninth embodiment of the present invention. The mixer comprises a body 905 having a circular or ring structure. The body comprises a plurality of slots, forming an inner concentric ring of slots 911 and an outer concentric ring of slots 910. Each slot is angled with respect to an axis passing through a center of the body. A plurality of arms 915 extend from an outer edge or side of the body towards a center of the body, where there is a central hole 916. The slots 910, 911 have at least one curved side. Each inner slot 911 has a protrusion 917 extending from an arm partially into the slot. Each of the plurality of arms 915 has a flat surface on a first side of the body and angled sides extending along at least a portion thereof to a second side of the body. The outer slots 910 and the inner slots 911 are each located between two arms 915 on at least a first side of the body.

The inner slots 911 and/or outer slots 910 have at least one chamfer 920 extending from a first side of the body to a second side of the body. The at least one chamfer 920 helps guide fluid flow through the mixer. In specific embodiments, a chamfer may have a length or depth of about 0.2% to 0.7%, for example 0.3%, of the inner pipe diameter into which the mixer is installed. A slot may have two chamfers 920, one chamfer on a first end of the slot and another chamfer on an opposing second end of a slot.

The inner slots 911 and/or outer slots 910 have a flap or lip 925 that extends or curves inwardly from a side of the body (e.g., a downstream side of the mixer once it is installed in a pipeline). In specific embodiments, the flap or lip 925 may have a length that is from about 0.5 to 5% of the length of a slot as measured from a first side of the body to a second side of the body. FIG. 9B illustrates a front perspective view of the mixer of FIG. 9A. FIG. 9C illustrates a rear perspective view of the mixer of FIG. 9A. FIG. 9D illustrates a cross-section view of the mixer of FIG. 9A along the shown line.

Pre-Mixer

FIG. 10 illustrates a perspective view of a pre-mixer 1000 according to a first embodiment of the present invention. The pre-mixer comprises a body 1005 having a circular or ring structure. A first arm 1015 extends across the body, thereby forming a top portion 1020 and a bottom portion 1025. The top portion 1020 comprises a semicircular slot. Two or more second arms 1018 extend from first arm 1015 towards the bottom of the ring structure and form a plurality of slots 1010, each slot being angled with respect to an axis passing through a center of the body. Each of the arms 1015, 1018 have a flat surface on a first side of the body. The slots may be oriented at the same angle or may be at different angles.

FIG. 11 illustrates a perspective view of second embodiment of a pre-mixer 1100 according to the present invention. The pre-mixer comprises a body 1105 having a circular or ring structure. Two or more arms 1115a extend across the ring structure. Two or more arms 1115b intersect arms 1115a, respectively, at right angles, thereby forming a plurality of slots 1130. Arms 1115b flare near one end, forming a bottom slot 1140, which is in the form of a slot with a wavy top. The arms 1115a, 1115b have a flat surface on a first side of the body. One or more of the 1130, 1140 slots are angled with respect to an axis passing through a center of the body. The slots may be oriented at the same angle or may be at different angles.

FIG. 12A illustrates a front view of third embodiment of a pre-mixer 1200 according to the present invention. The pre-mixer comprises a body 1205 having a circular or ring structure. Two or more arms 1210 extend across the ring structure. Two or more arms 1215 extend between arms 1210 and between arms 1210 and the ring structure, thereby forming a plurality of slots 1220. The slots are angled with respect to an axis passing through a center of the body. The slots may be oriented at the same angle or may be at different angles. Slots in outer sections may be oriented at a different angle than or opposing angle to the slots in a central section.

The slots 1220 have at least one chamfer 1250 extending from a first side of the body to a second side of the body. The slots 1220 also have a flap or lip 1240 that extends or curves inwardly from a side of the body (e.g., a downstream side of the mixer once it is installed in a pipeline). FIG. 12B illustrates a front perspective view of the pre-mixer of FIG. 12A. FIG. 12C illustrates a rear perspective view of the pre-mixer of FIG. 12A.

Pipe Assembly

According to the present invention, a pipe assembly may include at least one static mixer (e.g., two or more static mixers), at least one pre-mixer, at least one flow conditioner, or any combination thereof installed in a fluid flow pipeline.

In a specific embodiment, the at least one static mixer and at least one pre-mixer may be combined, for example within a sleeve or other container, to be installed within a fluid flow pipeline. However, it is possible to install the at least one static mixer and/or at least one pre-mixer in a pipeline without a sleeve, for example, using a pipe spool, flange, or other fitting. In a specific embodiment, the at least one static mixer and at least one pre-mixer may be spaced about 1D (one pipe diameter) apart from each other. However, larger spacings are possible.

FIG. 13 illustrates a schematic view of a specific embodiment in which a sleeve 1300 includes the mixer 900 of FIG. 9A and the pre-mixer 1200 of FIG. 12A to be installed in a fluid flow pipeline. The sleeve is installed such that the mixer and pre-mixer are in an orientation substantially perpendicular to a longitudinal axis of the fluid flow pipeline. In embodiments, the at least one static mixer and/or at least one pre-mixer may be welded to a fluid flow pipeline or may be mounted in flanges.

FIG. 14 illustrates a schematic view of a pipe assembly 1400 according to an embodiment of the present invention comprising a fluid flow pipeline 1405 and at least one static mixer 1410 installed in the fluid flow pipeline in an orientation substantially perpendicular to a longitudinal axis of the fluid flow pipeline. The at least one static mixer 1410 is installed upstream of a sampler 1415. The at least one static mixer may be at any distance upstream of sampler 1415, for example 1D to 10D, or 2D to 5D, where D is the internal pipe diameter.

In embodiments, the fluid flow pipeline may also include at least one flow conditioner 1420, positioned upstream and/or downstream of at least one static mixer 1410 and optionally at least one pre-mixer 1412.

In a specific embodiment, the flow conditioner may comprise a plate having through holes arranged in one or more concentric rings. The flow conditioner may be an integral, unitary body machined out of the same material. Thus, the flow conditioner does not include any tube bundles or combination of welded tubes. In a specific embodiment, suitable flow conditioners include, but are not limited to, CPA TBR®, CPA 50E®, CPA 55E®, CPA 65E® flow conditioners, available from Canada Pipeline Accessories, Inc. of Calgary, Canada.

In embodiments, the flow conditioner may be contained within a sleeve with the at least one static mixer and/or at least one pre-mixer to be installed within a fluid flow pipeline. However, it is possible to install the at least one flow conditioner in a pipeline separately without a sleeve, for example, using a pipe spool, flange, or other fitting. In a specific embodiment, the at least one flow conditioner may be installed about 3D to about 5D, wherein D is an internal pipe diameter, in front of the at least one static mixer and/or at least one pre-mixer.

VI. INDUSTRIAL APPLICABILITY

The present invention relates to a static mixer comprising a plurality of slots for mixing fluid flow within a pipeline and to a method for mixing fluid flow using the static mixer. The static mixer helps ensure proper mixing of fluid flow within a fluid flow pipeline and therefore to achieve proper performance of a sampling system.

Although the present invention has been described in terms of particular and alternative embodiments, it is not limited to those embodiments. Alternative embodiments, examples, and modifications which would still be encompassed by the invention may be made by those skilled in the art, particularly in light of the foregoing teachings.

Those skilled in the art will appreciate that various adaptations and modifications of the exemplary and alternative embodiments described above can be configured without departing from the scope and spirit of the invention. Therefore, it is to be understood that, within the scope of the appended claims, the invention may be practiced other than as specifically described herein.

The invention claimed is:

1. A device to be installed in a pipeline, comprising:
   1) at least one static mixer comprising:
      a body having a plurality of slots through the body, said slots having one or more sides that are angled with respect to an axis passing through a center of the body, wherein the plurality of slots comprises at least one concentric ring of slots; and
      a plurality of arms extending from an outer edge of the body towards a center of the body; and
   2) at least one pre-mixer comprising:
      a body having a ring structure and comprising two or more first arms that extend straight across the ring structure with opposing ends connecting to the ring structure, two or more second arms, each second arm extending from the ring structure to a side of a first arm facing the ring structure, thereby forming a first set of slots, and two or more third arms, each third arm extending between opposing sides of said two first arms, thereby forming a second set of slots,
   wherein the at least one static mixer and the at least one pre-mixer are arranged in a sleeve about 1D apart, wherein D is an internal diameter of the pipeline.

2. A pipe assembly for flow measurement, comprising:
   a fluid flow pipeline;
   at least one flow conditioner comprising a plate having a plurality of through holes arranged in one or more concentric rings;
   at least one static mixer comprising a body having a plurality of slots through the body, said slots having one or more sides that are angled with respect to an axis passing through a center of the body; a plurality of arms extending from an outer edge of the body towards a center of the body, wherein the plurality of slots comprises at least one concentric ring of slots; and
   at least one pre-mixer comprising a body having a ring structure; two or more first arms parallel to each other, each first arm extending straight across the ring structure with opposing ends connecting to the ring structure, two or more second arms, each second arm extending from the ring structure to a side of a first arm facing the ring structure, thereby forming a first set of slots, and two or more third arms, each third arm extending between opposing sides of said two first arms, thereby forming a second set of slots,
   wherein said at least one flow conditioner and said at least one static mixer are disposed in said fluid flow pipeline in an orientation substantially perpendicular to a longitudinal axis of said fluid flow pipeline.

3. A pipe assembly according to claim 2, further comprising two or more static mixers.

4. A pipe assembly according to claim 2, wherein one or more slots of the at least one static mixer comprise at least one chamfer extending from a first side of the body to a second side of the body.

5. A pipe assembly according to claim 4, wherein the at least one chamfer has a length or depth of about 0.2% to 0.7% of an inner pipe diameter into which the at least one static mixer is installed.

6. A pipe assembly according to claim 2, wherein one or more slots of the at least one static mixer comprise at least one lip or flap that extends or curves inwardly from a side of the body.

7. A pipe assembly according to claim 6, wherein the at least one lip or flap has a length that is about 0.5% to 5% of a length of a slot as measured from a first side to a second side of the body.

8. A pipe assembly according to claim 2, wherein the pre-mixer comprises one or more slots having a chamfer extending from a first side of the body to a second side of the body.

9. A pipe assembly according to claim 2, wherein the pre-mixer comprises one or more slots having a lip or flap that curves inwardly from a side of the body.

10. A pipe assembly according to claim 2, wherein the flow conditioner is arranged about 3D to about 5D in front of said at least one static mixer, wherein D is an internal diameter of the fluid flow pipeline.

11. A pipe assembly according to claim 2, wherein the at least one pre-mixer and the at least one static mixer are arranged in a sleeve.

12. A pipe assembly according to claim 2, wherein the static mixer comprises an inner concentric ring of slots and an outer concentric ring of slots.

13. A pipe assembly for flow measurement, comprising:
- a fluid flow pipeline;
- at least one flow conditioner comprising a plate having a plurality of through holes arranged in one or more concentric rings; and
- at least one pre-mixer,
- wherein said at least one flow conditioner and said at least one pre-mixer are disposed in said fluid flow pipeline in an orientation substantially perpendicular to a longitudinal axis of said fluid flow pipeline,
- wherein said at least one pre-mixer comprises:
  - a body having a ring structure;
  - two or more first arms parallel to each other, each first arm extending straight across the ring structure with opposing ends connecting to the ring structure,
  - two or more second arms, each second arm extending from the ring structure to a side of a first arm facing the ring structure, thereby forming a first set of slots, and
  - two or more third arms, each third arm extending between opposing sides of said two first arms, thereby forming a second set of slots.

* * * * *